United States Patent [19]

Levine et al.

[11] Patent Number: 5,887,550
[45] Date of Patent: Mar. 30, 1999

[54] COMBINED RETRACTABLE PET LEASH AND FLASHLIGHT

[75] Inventors: Anthony H. Levine, Woodland Hills; Frank Thomas Brown, Redondo Beach, both of Calif.

[73] Assignee: Anthony Harris Levine, Woodland Hills, Calif.

[21] Appl. No.: 853,628

[22] Filed: May 9, 1997

Related U.S. Application Data

[63] Continuation-in-part of Ser. No. 42,300, Aug. 7, 1995, Pat. No. Des. 379,689.

[60] Provisional application No. 60/017,514, May 10, 1996.

[51] Int. Cl.⁶ .................................................. A01K 27/00
[52] U.S. Cl. .............................................. 119/796
[58] Field of Search .................................. 119/792, 795, 119/796, 797, 856, 858, 769, 859; 362/84, 109, 124, 253

[56] References Cited

U.S. PATENT DOCUMENTS

D. 351,264  10/1994  Stout .
D. 379,689  6/1997  Levine et al. .......................... D30/153
2,314,504  3/1943  Lifchultz ................................. 119/796
3,693,596  9/1972  Croce et al. .
3,853,283  12/1974  Croce et al. .
5,377,626  1/1995  Kilsby et al. .
5,429,075  7/1995  Passarella et al. ...................... 119/795
5,483,926  1/1996  Bogdahn .
5,558,044  9/1996  Nasser, Jr. et al. ..................... 119/796

FOREIGN PATENT DOCUMENTS 91 12 529 U  10/1991  Germany .
8201744  4/1982  Netherlands .

Primary Examiner—Thomas Price
Attorney, Agent, or Firm—Lewis Anten, Esq.; Amedeo Ferraro, Esq.

[57] ABSTRACT

The present invention is an improved combined pet leash and flashlight comprising a mechanical dispensing and retracting cord for the purpose of tethering, restraining and controlling a pet during a walk.

46 Claims, 24 Drawing Sheets

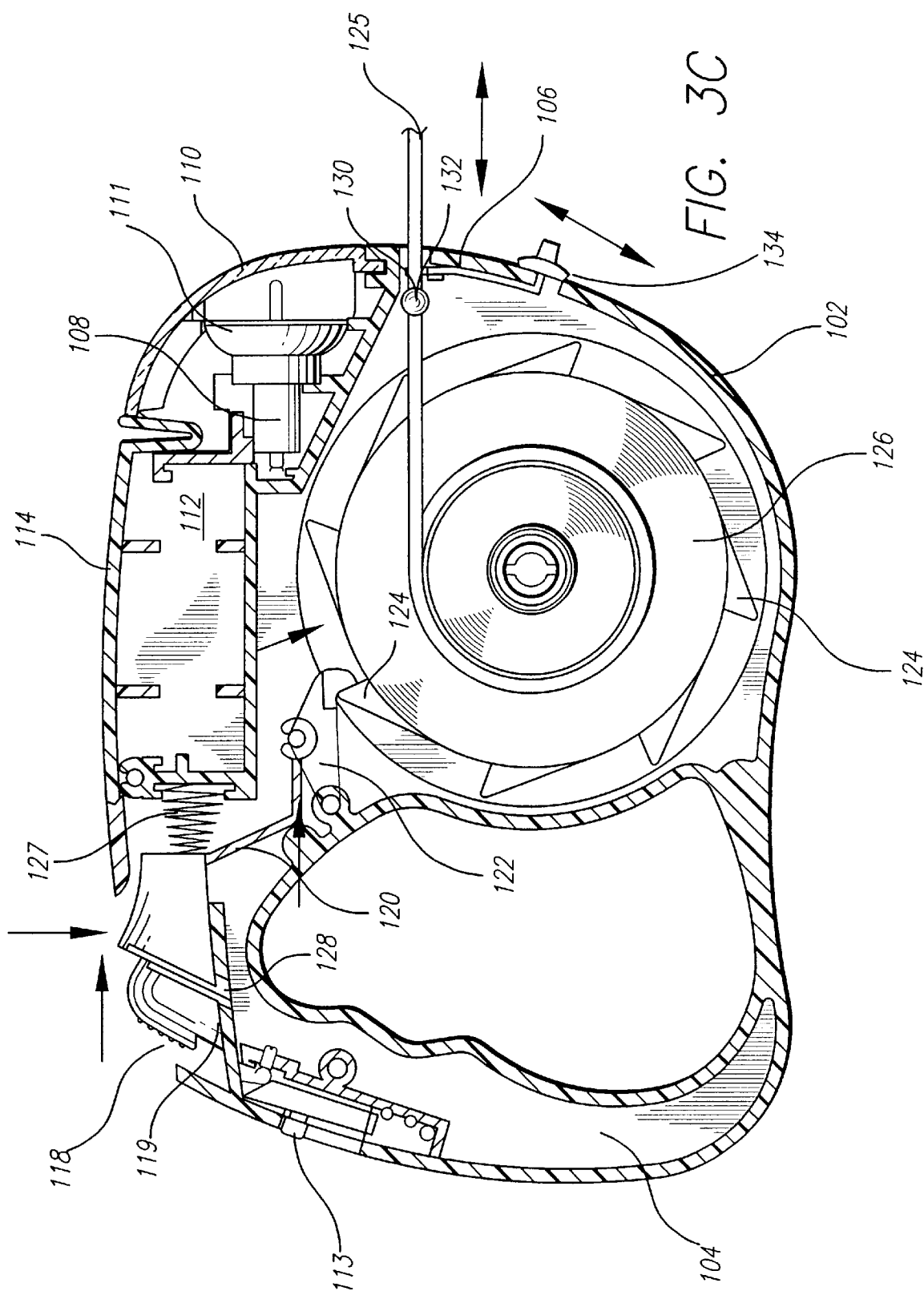

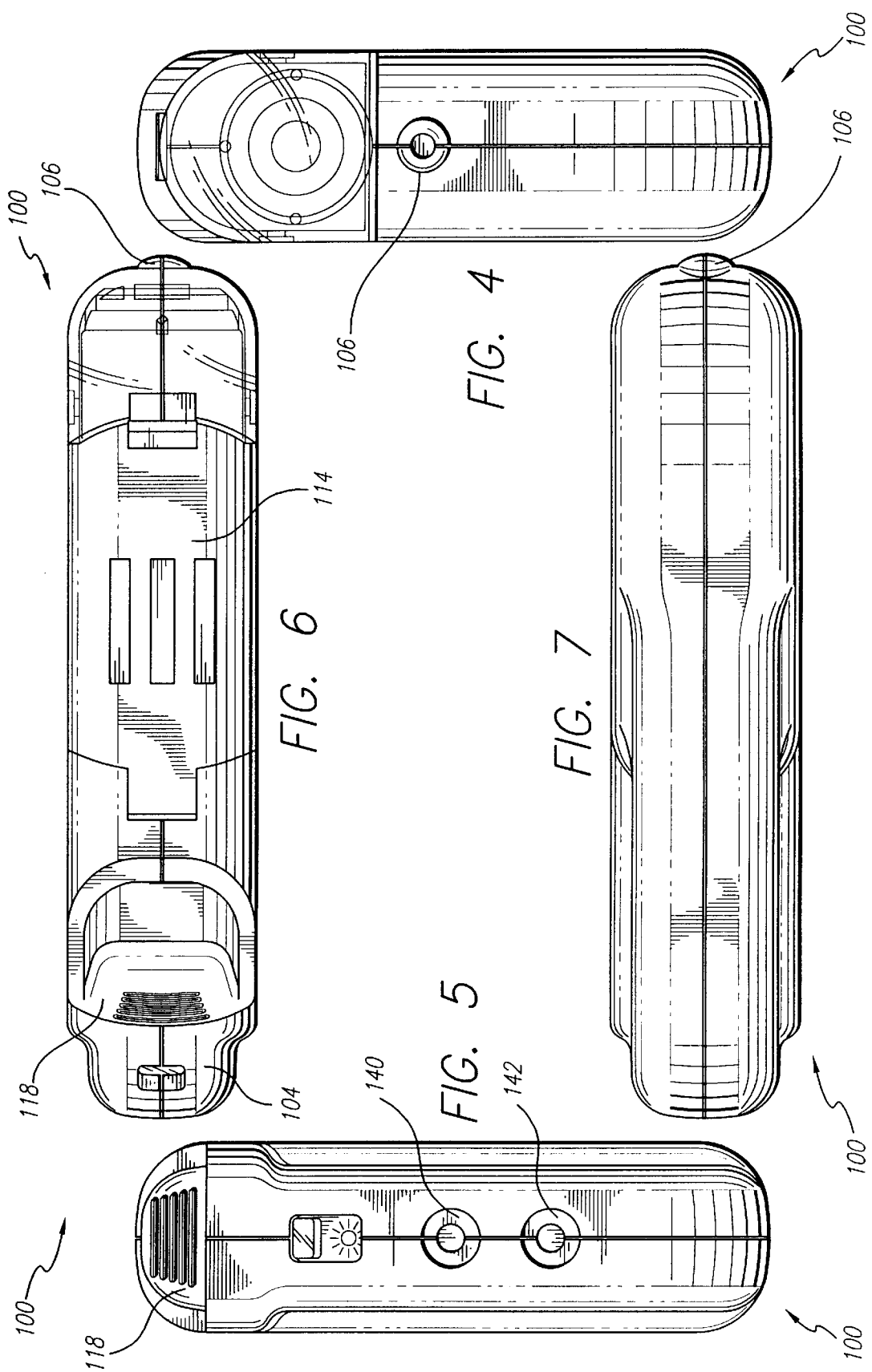

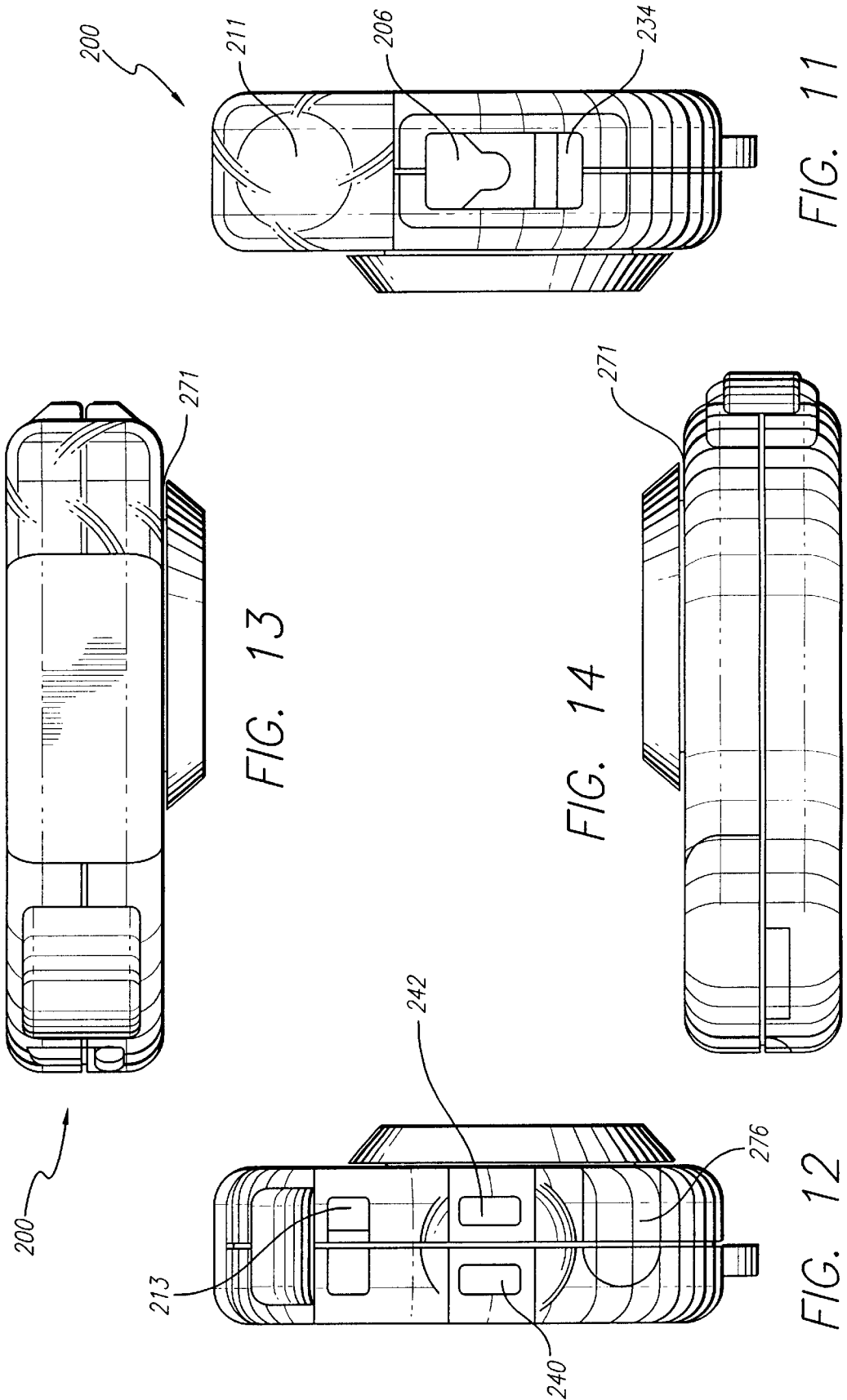

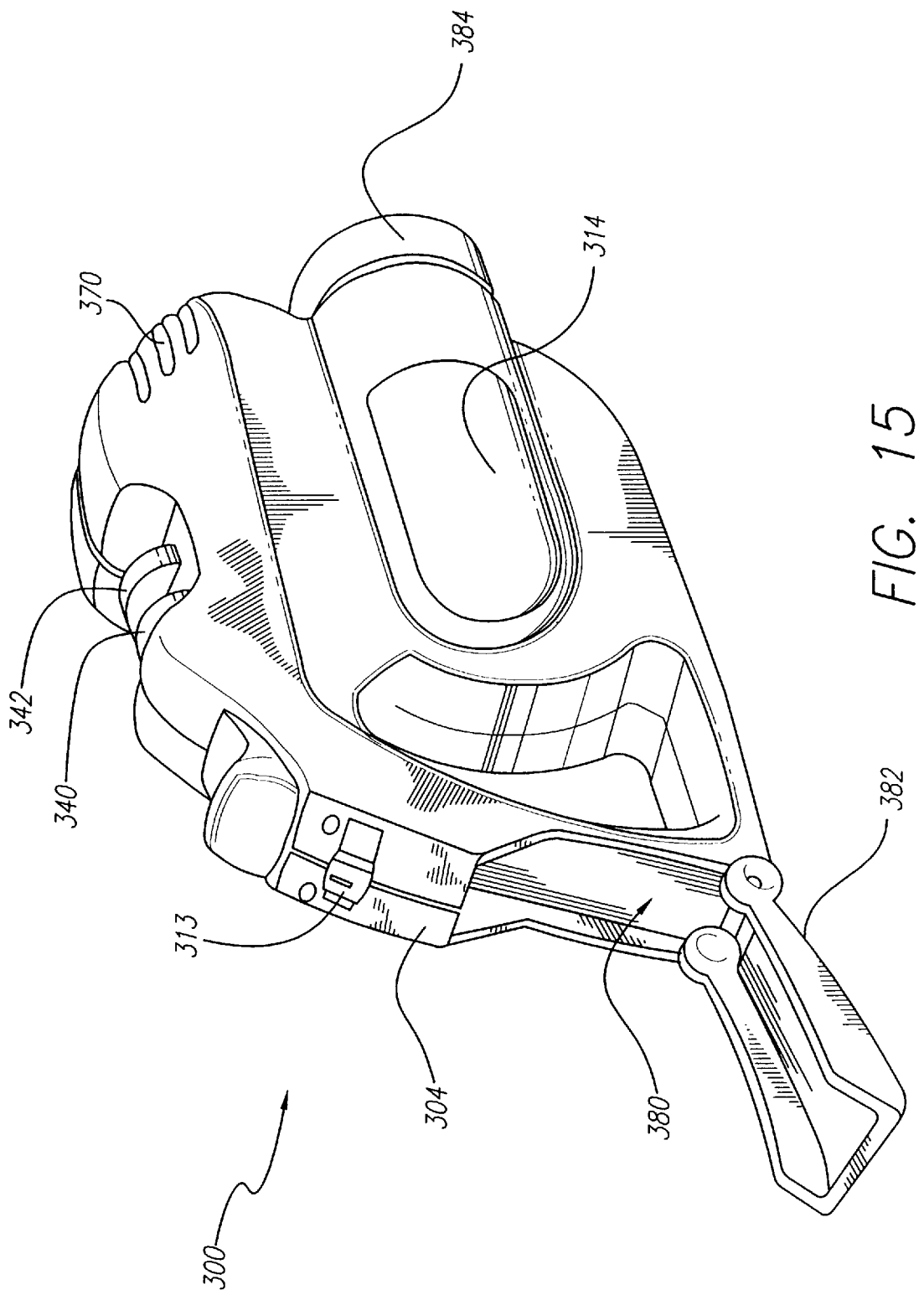

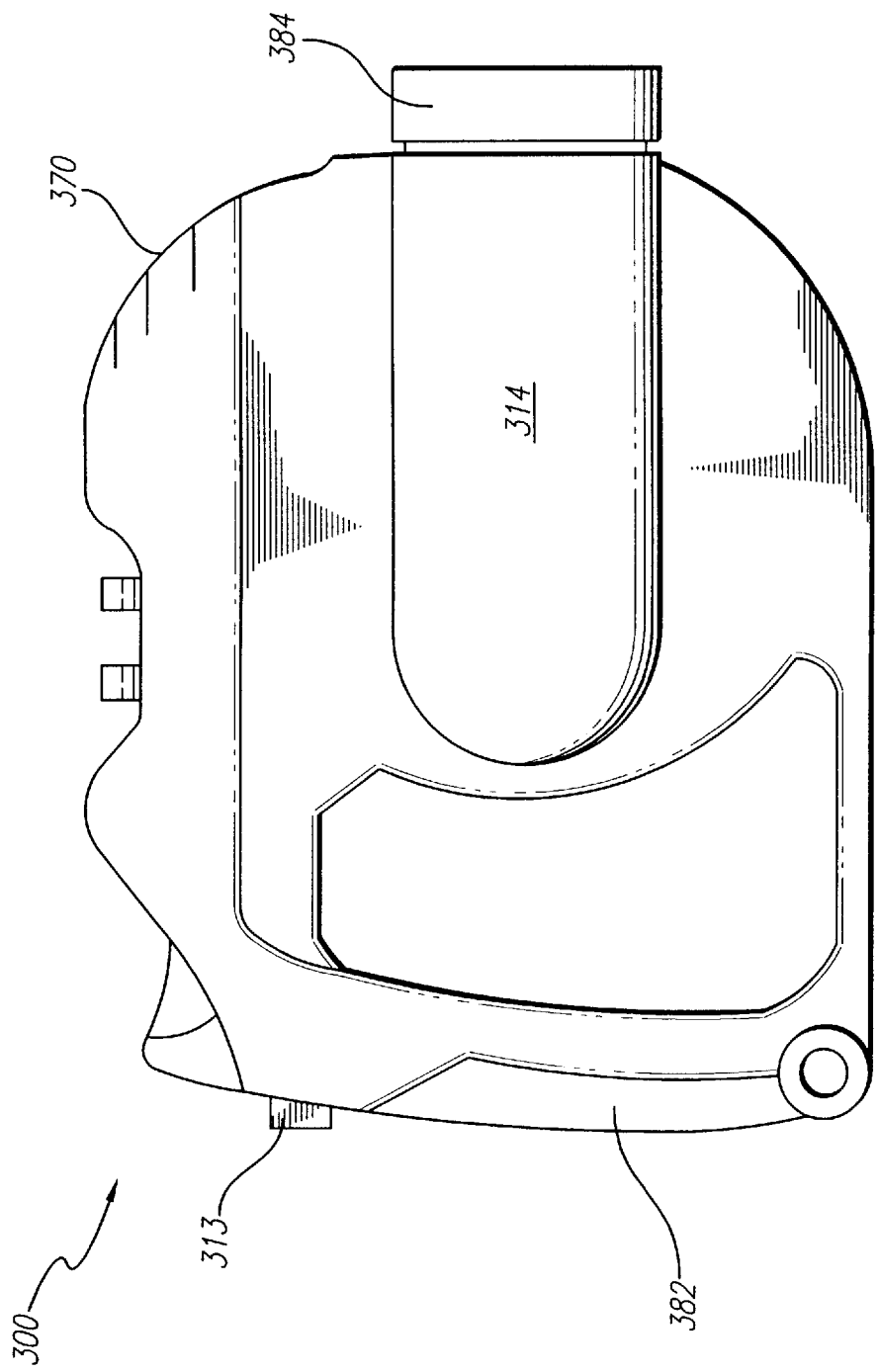

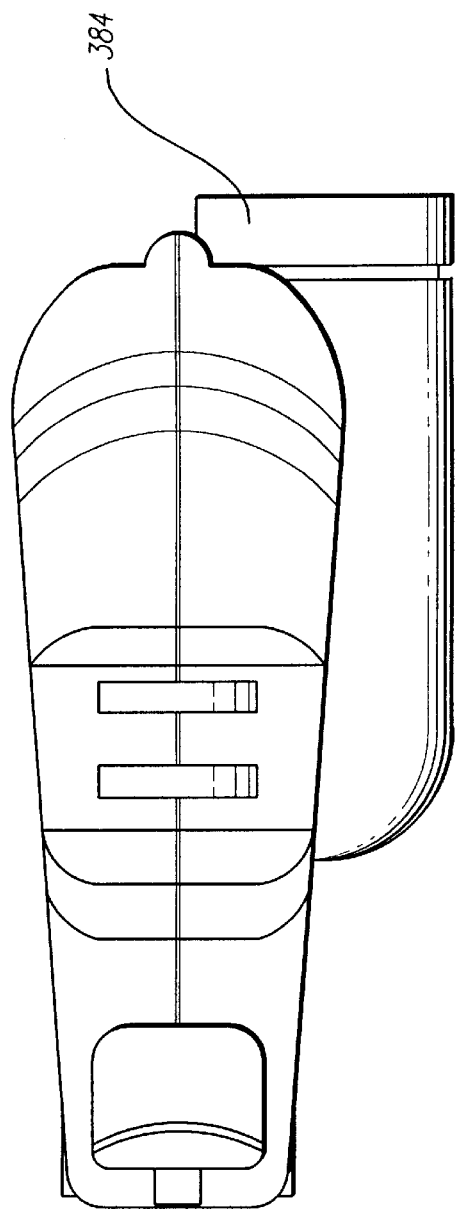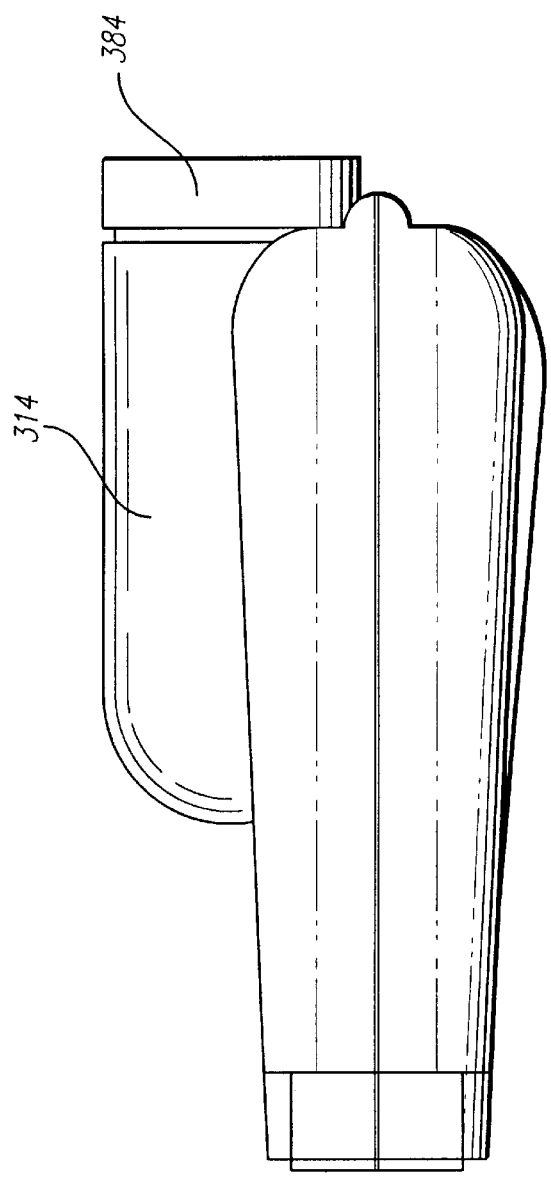

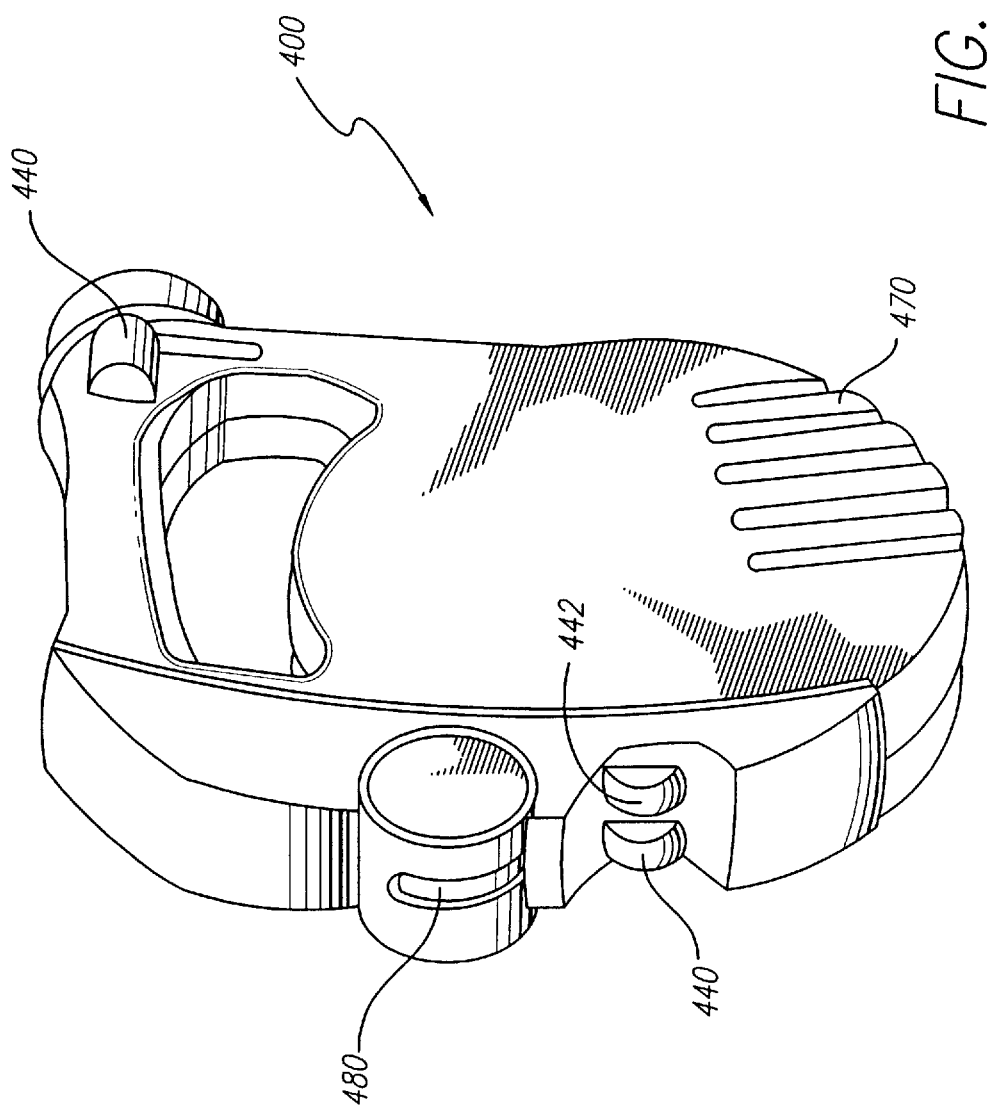

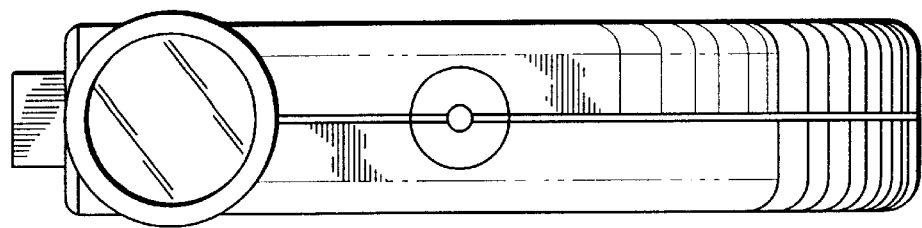
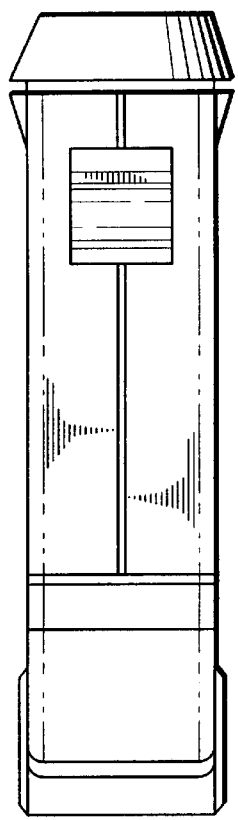
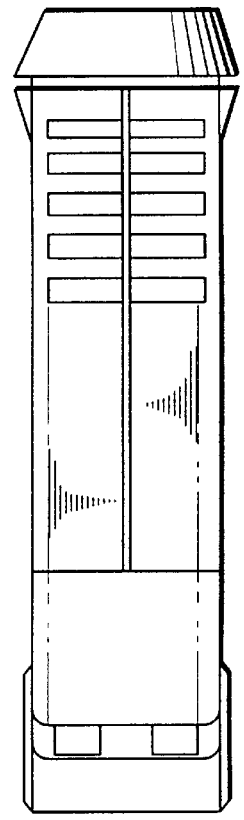
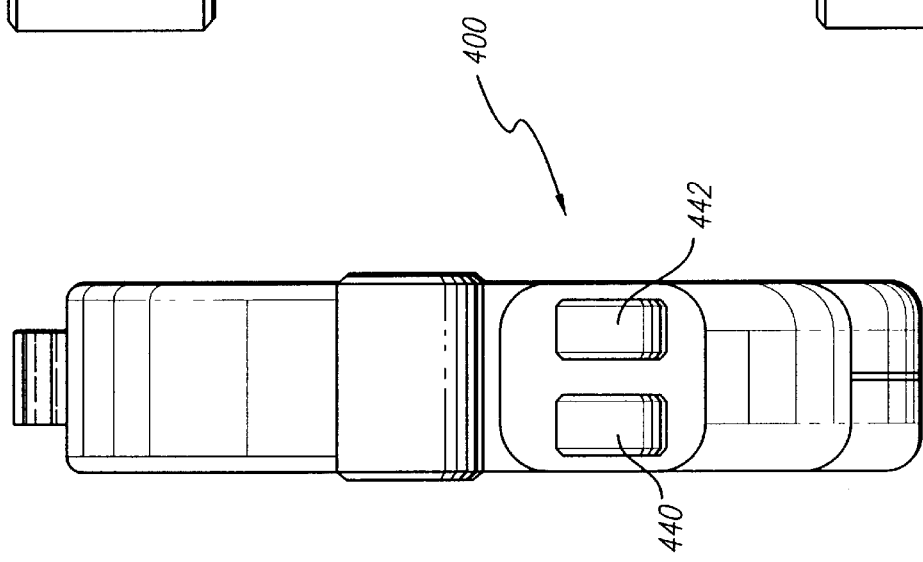

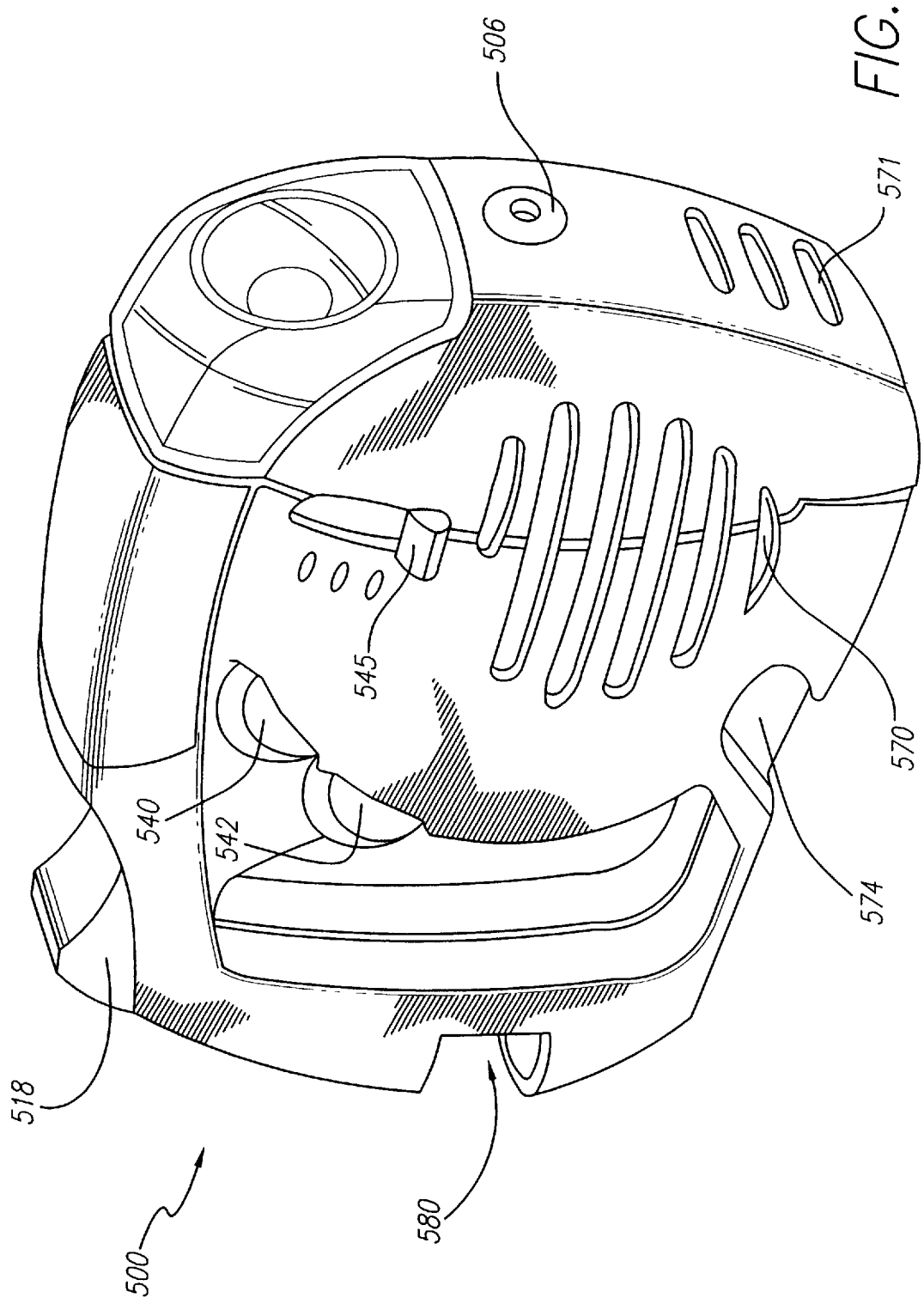

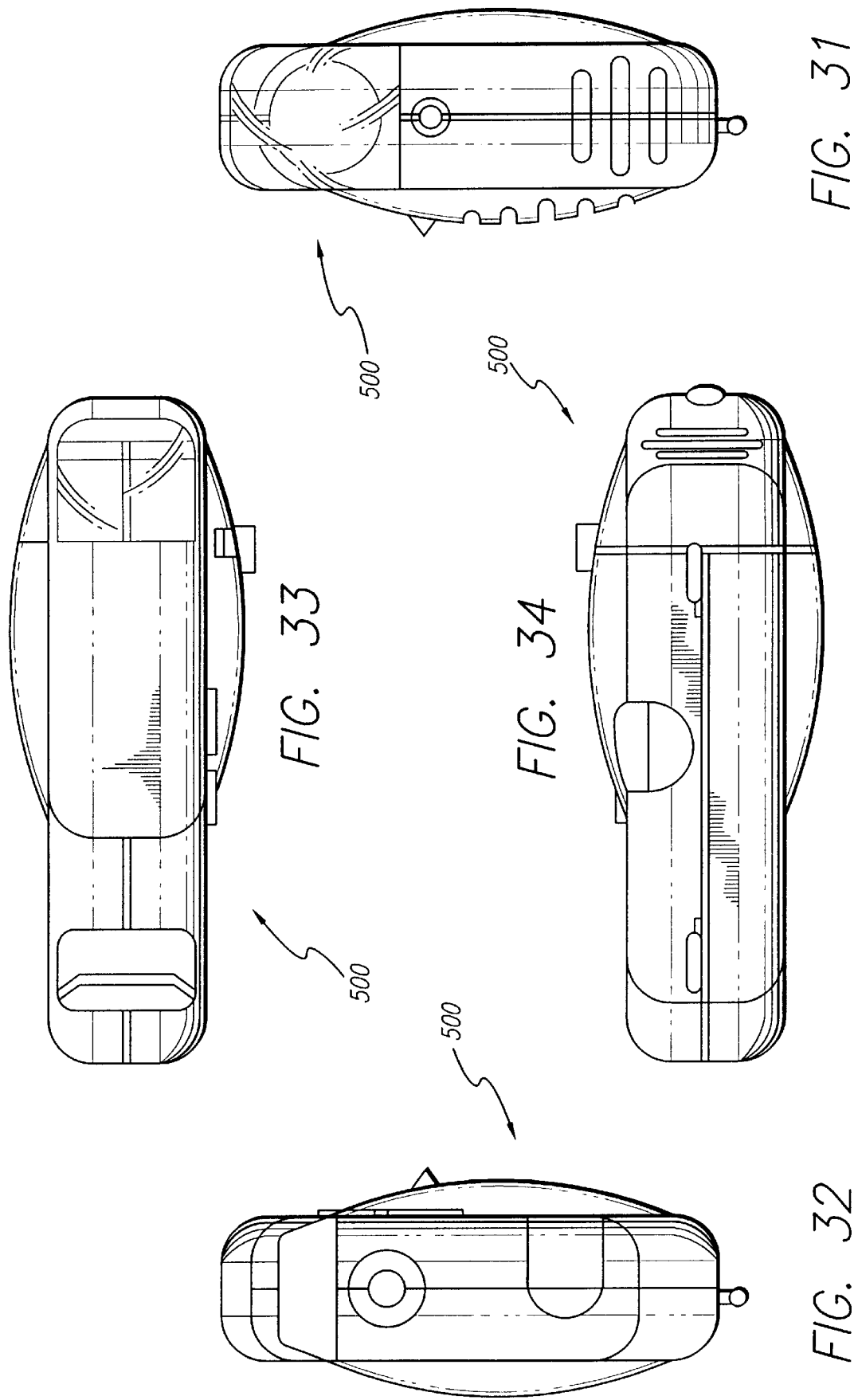

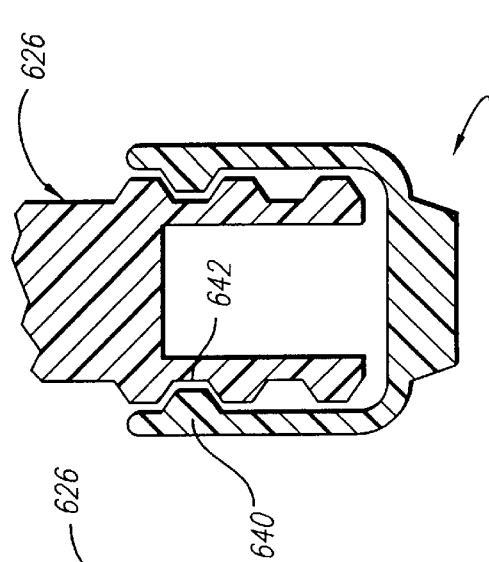
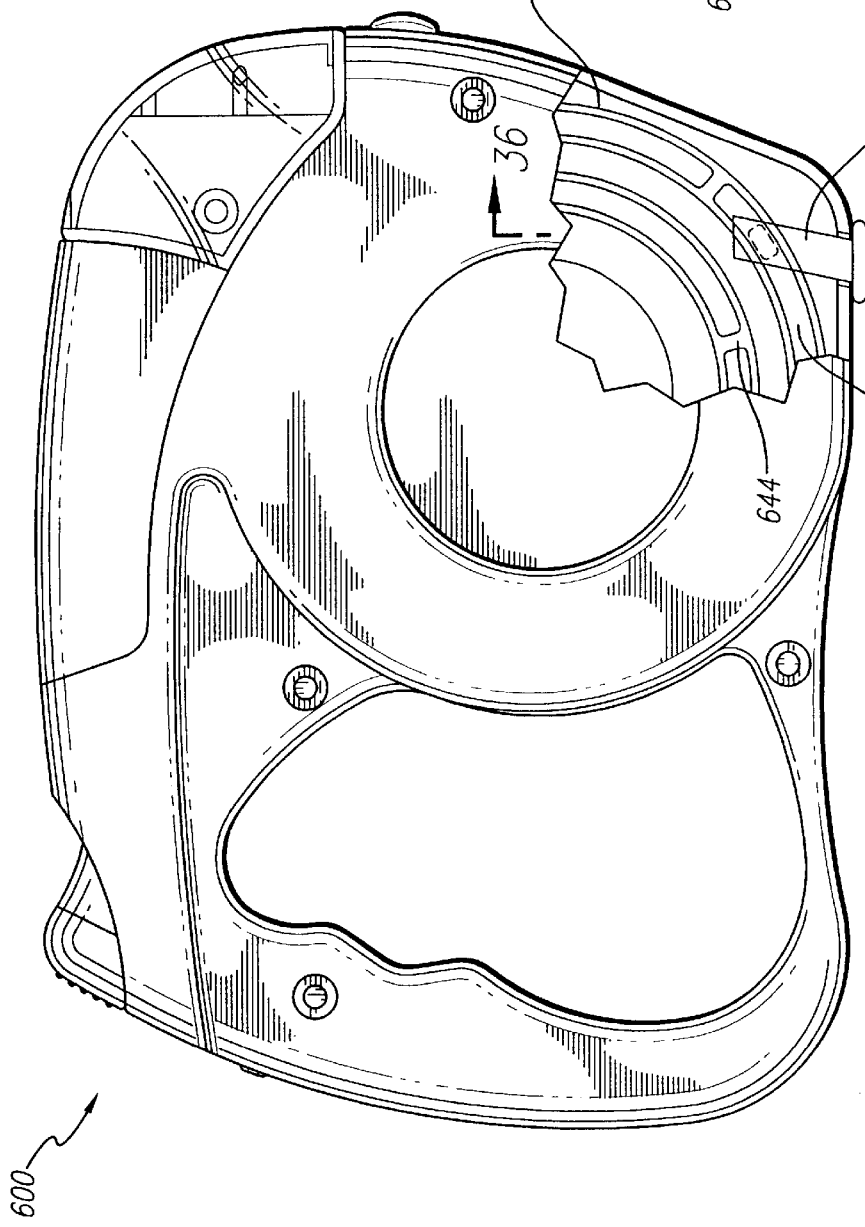

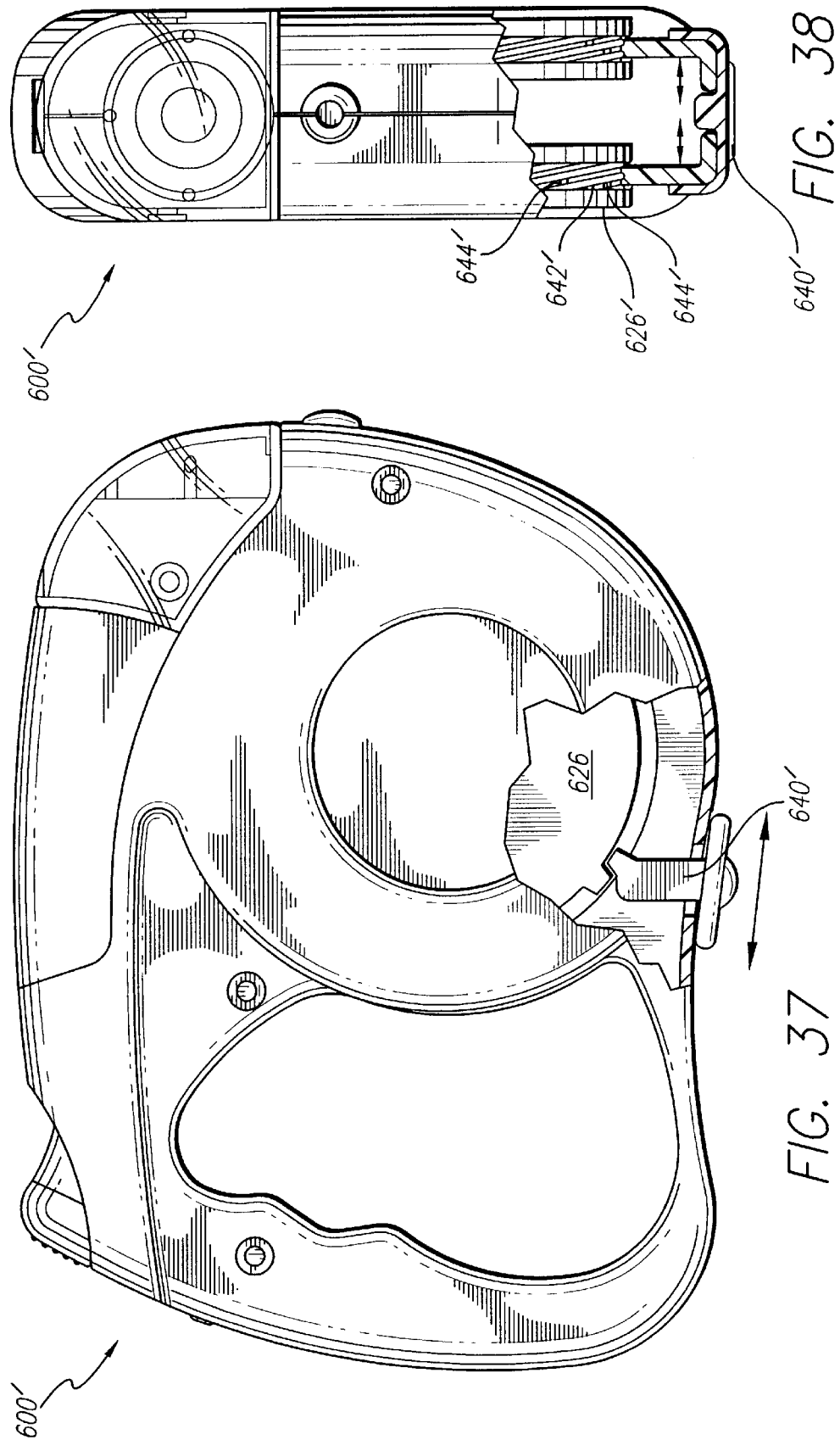

5,887,550

COMBINED RETRACTABLE PET LEASH AND FLASHLIGHT

This application is a continuation-in-part of application Ser. No. 29/042,300, filed Aug. 7, 1995, now U.S. Pat. No. Des. 379,689, issued Jun. 3, 1997.

BACKGROUND OF THE INVENTION

Related Application

This application claims priority of co-pending United States provisional application Ser. No. 60/017,514 filed on May 10, 1996.

Field of the Invention

The present invention relates generally to the field of leashes for pets. More specifically, this invention relates to devices used to restrain and control an animal's freedom of movement and distance from its owner or trainer, with a hand held restraint and a retractable leash cord mechanism.

Description of the Related Art

There have long been leashes for controlling and holding pets during walks. Devices for restraining, controlling and limiting the distance a pet or animal can wander from a tethered point or person are well known in the art. Typically these devices are unsafe and mechanically unreliable or difficult to operate with one hand. One problem associated with such devices is that leashes occupy at least one hand of a user so that other items, which can be useful or necessary to the user, cannot easily be carried. Some safety items, such as a flashlight and defensive items such as a mace canister or radio may therefore be left behind. One may stray into an unfamiliar area with poor lighting while walking a pet. One may be more vulnerable to crime while out walking a pet, because one is typically outside his or her yard and on foot in a public place. Therefore, it is while one is walking a pet that certain items are apt to be most urgently needed and yet not at hand.

An example of a combined pet leash and flashlight is disclosed in U.S. Pat. No. 5,429,075 issued to Passarella et al. on Jul. 4, 1995. The Passarella device is a conventional pet leash having the handle portion (42) secured to a conventional flashlight. There is no teaching in Passarella for a retractable leash or a restraining mechanism for controlling a leash that is also a flashlight. The Passarella device merely teaches a means for keeping a conventional leash and a conventional flashlight joined together.

Therefore, there exists a need for a device that is a combination retractable pet leash and flashlight having a restraining mechanism for controlling a leash and a light, in which the combined device can be held and controlled in one hand in which the light switch and stopping mechanism can be operated with one finger of the hand holding the device.

SUMMARY OF THE INVENTION

The present invention is an improved combined pet leash and flashlight comprising a mechanical dispensing and retracting cord for the purpose of tethering, restraining and controlling a pet during a walk. The present invention includes a variety of features which are set forth in detail below.

1. Combination Flashlight

The present invention comprises a built in flashlight that is operated by the user. The incorporation of the flashlight removes the need for the pedestrian to carry a separate flashlight in the opposite hand for the purposes of illuminating the walking path or site and to alert others to the presence of the user and pet. By encompassing both a retractable pet leash mechanism and a flashlight, the user is permitted a greater degree of safety and higher visibility of the pet, the user, and/or any feces left by the pet, which the owner may be responsible for. If a person is using both hands, one for the flashlight and the other to hold the leash, the user cannot take close control of the pet's collar (which is the standard and best means of controlling a pet in an emergency situation), unless the user drops the flashlight, and thus compromising safety and means of clear sight and high visibility. The light bulb reflector in the device of the present invention provides optimum and even beam spreading at a range of 1 to 16 feet, for example. Most flashlights use a polished parabolic reflector that leave bright spots making it difficult to see easily between the bright spots and dark areas directly adjacent to the bright spots. The lenticulated surface of the reflector of the present invention provides a smooth beam of light that is sufficiently even to permit the user to read a newspaper if so desired.

The light source of the pet leash assembly of the present invention in one embodiment is angled upward 20 to 30 degrees to the horizontal axis of the housing to reduce wrist fatigue to the user. The most comfortable position of use of the pet leash assembly of the present invention would be to point the unit directly to the ground at the user's feet. By angling the light source at an upward angle of 20 to 30 degrees off the horizontal axis of the housing, the fatigue on the user's wrist is reduced by not having to hold the wrist in such a manner necessary to illuminate the path three to fifteen feet ahead.

2. Locking Mechanism Feature

A second feature of the present invention is the one finger stop and lock mechanism. Existing products on the market use one of a few techniques to pause or stop and lock the further reeling out, or retracting of the leash cord. There are at least two control options on existing retractable dog leashes. When the buttons on the retractable leashes of the past were depressed, with a constant finger pressure, the buttons would engage a stop to prevent any further cord from reeling out. When finger pressure on the button was released, the cord was then free to reel in and out to any length desired.

The second option available on the prior devices was a lock and/or hold position. The difference between these two types of stops is similar to the pause versus stop button on mechanical audio cassette tape deck. In the pause mode, constant finger pressure is usually applied to the button to temporarily stop letting out, or reeling in of any leash cord. The stop/lock mode and the reel were locked into position by an intruding or engaging piece of metal or plastic that prevents the reel from moving, without the need for constant finger pressure.

In the past, pet leashes included a locking mechanism in which the leash lock button was fully engaged with one finger movement such that the reel would be locked into place and the finger could be removed. To disengage the lock, the reverse movement would have to be performed. There was no option for a temporary pause position, it was either locked at a fixed length or unlocked.

Prior pet leashes also included a pause/hold button (or lever) that was pushed by one finger to stop the reel from letting out any more leash cord. Then another finger was required to push a second pin/button or lever, that was perpendicular to the first button, and on the side of the housing, into the housing to lock the reel in place such that finger pressure would then be released from the first button. Such a device required two hands to operate both buttons and lock the mechanism. The second pin/button that was used on such a design, jammed, jams often, got filled with dirt and became difficult to engage without excess finger pressure or resulted in contortions of the hand to reach it with the same hand holding the leash. Therefore, a second hand was required (the one holding the flashlight) to push in the lock button.

In the present invention, a one point engagement/locking mechanism is disclosed which is more reliable than the prior device because only one mechanism has to align and interface with the reel mechanism to either pause/stop or lock the device. The slot of the present invention used to lock the button is self-cleaning and not easily affected by environmental contaminates.

The advantages of the present invention are that many features (including the light, stop and lock mechanisms), are incorporated into a one handed, one finger operation. The stop and lock mechanisms use less finger pressure and exertion to engage and disengage and provides both the option of a momentary hold on the leash to allow it to be dispensed at a controlled rate, and/or stop and lock the fixed cord at the length dispensed.

In the stop/lock mode of the present invention, finger pressure is applied momentarily to slide the pause button into the engaged locked position. After initial finger pressure is applied, the mechanism and leash length is locked in place, and can not be changed without reversing the process. Both pause and locked button positions are engaged by use of only one finger, typically the user's thumb. In the present invention, no second hand or finger is needed to operate the light and stop and lock mechanisms or any other feature the present invention.

3. Leash Length Limiter

Another feature of the present invention is the length of cord limiter. This feature may be a bead or device attached to, or adjusted to a certain point on the leash cord, perhaps midway or at multiple points along the length of the leash.

By using a plate, rod or disc with a sliding or rotating keyhole shaped slot in the housing, the amount of free reeling leash can be limited depending on the open or closed position of the keyhole. If the bead is placed midway on a 15 foot or 16 foot retractable leash for example, then with the keyhole closed, only the leash cord passes through the keyhole and is stopped by the bead at the 8 foot point. Thus, with the key hole in the open position, the leash can fully operate from 0 to 16 feet for example. It is appreciated that the length of the leash is not limited to this range and that the leash may have any length suitable for its intended purpose without departing from the scope of the present invention.

Alternatively, the present invention includes a controllable mechanism allowing the user to select the amount of cord to be unreeled. Such a mechanism for example would comprise a moveable intersecting pin, knob, slide or part (collectively referred to as a "pin") that runs inside spiral grooves molded into the outer or inner side walls or edges of the main wheel of the reel and that would limit the number of rotations the main wheel, via molded stops, thus controlling the amount of cord that could unwind depending on which groove is selected for the pin run inside. The spiral grooves are divided into two or more tracks, each track having a molded stop at a different point. When the pin is placed into a specific groove pathway on the wheel, the number of wheel rotations possible are controlled by the fixed stop points of each groove. As only a fixed number of rotations would be possible per groove, a controllable, selectable and fixed amount of cord to be unreeled is possible.

The advantage of having a leash length limiter is to allow full movement of range without letting the pet get too far away. If a dog is being walked on a normal sidewalk, 16 feet of range of leash cord is too much room to give the dog to run around where it could bother other people or get in trouble. If the leash range of motion is limited by the bead option for example, to a 1ft to 8 ft leash or shorter you have more control and time to react to quick pet movements (i.e. to stop the dog from running into the street and getting hit by a car, or attacking someone.) If the user does not react in time, the dog could run to the end of the leash and get into trouble, or cause a hazard. The leash limiter option, would allow control over these types of situations where more limited freedom of motion is desired. In a bigger area, where there is no danger, or reason for concern you could let the dog again have a bigger 32 foot diameter range of motion.

4. Special Features of the Rechargeable Version of the Present Invention

On most rechargeable devices, the batteries are either recharged (1) by removing the batteries and placing them in a charger, (2) bringing a power cord and plug up to and into the device, or (3) the device will have power contacts on the outer housing so it charges when placed in the cradle which only allows factory servicing for battery replacement.

In the present invention, the recharging contacts are on the battery door (and or housing), for easy charging of the batteries while the unit is in its cradle, or for easily removing the batteries to charge them in a separate unit. Also, the batteries of the device of the present invention may be easily changed by the consumer. None of the prior devices has a removable battery and combined cradle recharged devices.

A removable or permanently attached hand strap allows the user to maintain control and possession of the device of the present invention in that the device can hang from the wrist or from a pole/stake to remove the tiresome task of actually having to constantly hold the device to temporarily allow two hands to be free for performing other tasks, such as grasping the pet with both hands in an emergency situation, or to allow unattended use of the device by the pet. For example, while the pet is tied to a bench, and the owner is away from the pet.

5. Radio Features

The device of the present invention may also include a radio receiver with a built in speaker and/or headphones. Switches and knobs for controlling the frequency and volume of the radio may be positioned on the housing of the device to provide easy access by the user.

6. Additional Features

The device may include various electronic modules or accessories in addition to those described above. For example, such electronics may include, a timer, a clock with or without an alarm, an emergency help siren or voice announcing circuit and/or a signal generator to assist in controlling and training the actions and reactions of a guide dog for the disabled such as those that may be mute and incapable of giving distinguishable verbal commands to the pet or guide dog. The device of the present invention may also include a coin holder/dog waste bag holder, slot/compartment, a key holder, a key ring/or storage compartment, flashing LED version, whistle, pepper spray, wrist mounted version flashlight feature as examples.

OBJECTS OF THE PRESENT INVENTION

It is thus an object of the present invention to provide a leash apparatus which combines the pet control means of a leash with means for retaining items particularly needed when walking a pet.

It is another object of the present invention to provide such an apparatus which is specifically suited to retaining a flashlight.

It is still another object of the present invention to provide such an apparatus which provides fast and easy access to these items for maximized safety and convenience.

It is finally an object of the present invention to provide such an apparatus which is simple and reliable in construction and inexpensive to manufacture.

These and other objects of the present invention will become apparent from a review of the accompanying drawings and the detailed description of the drawings.

BRIEF DESCRIPTION OF THE DRAWINGS

Various other objects, advantages, and features of the invention will become apparent to those skilled in the art from the following discussion taken in conjunction with the following drawings, in which:

FIG. 3C is an enlarged cross sectional view of the combination pet leash and flashlight of FIG. 3A with the reel mechanism in the locked position;

FIG. 4 is front end view of FIG. 1;

FIG. 5 is a rear end view of FIG. 1;

FIG. 6 is top plan view of FIG. 1;

FIG. 7 is a bottom plan view of FIG. 1;

FIG. 11 is front end view of FIG. 8;

FIG. 12 is a rear end view of FIG. 8;

FIG. 13 is top plan view of FIG. 8;

FIG. 14 is a bottom plan view of FIG. 8;

FIG. 15 is a left side perspective view of an alternative embodiment of the combination pet leash and flashlight of the present invention;

FIG. 16 is left side elevational view of FIG. 15;

FIG. 20 is top plan view of FIG. 15;

FIG. 21 is a bottom plan view of FIG. 15;

FIG. 22 is a left side perspective view of an alternative embodiment of the combination pet leash and flashlight of the present invention;

FIG. 24 is front end view of FIG. 22;

FIG. 25 is a rear end view of FIG. 22;

FIG. 26 is top plan view of FIG. 22;

FIG. 27 is a bottom plan view of FIG. 22;

FIG. 28 is a left side perspective view of an alternative embodiment of the combination pet leash and flashlight of the present invention;

FIG. 31 is front end view of FIG. 28;

FIG. 32 is a rear end view of FIG. 28;

FIG. 33 is top plan view of FIG. 28;

FIG. 34 is a bottom plan view of FIG. 28.

FIG. 35 is side elevational partial cutaway view of an alternative embodiment of the pet leash of the present invention having a leash length limiter;

FIG. 36 is partial sectional view along lines 36—36 of FIG. 35;

FIG. 37 is side elevational partial cutaway view of another alternative embodiment of the pet leash of the present invention having a leash length limiter; and FIG. 38 is front end view of FIG. 37.

DETAILED DESCRIPTION OF THE DRAWINGS

Figure 1:
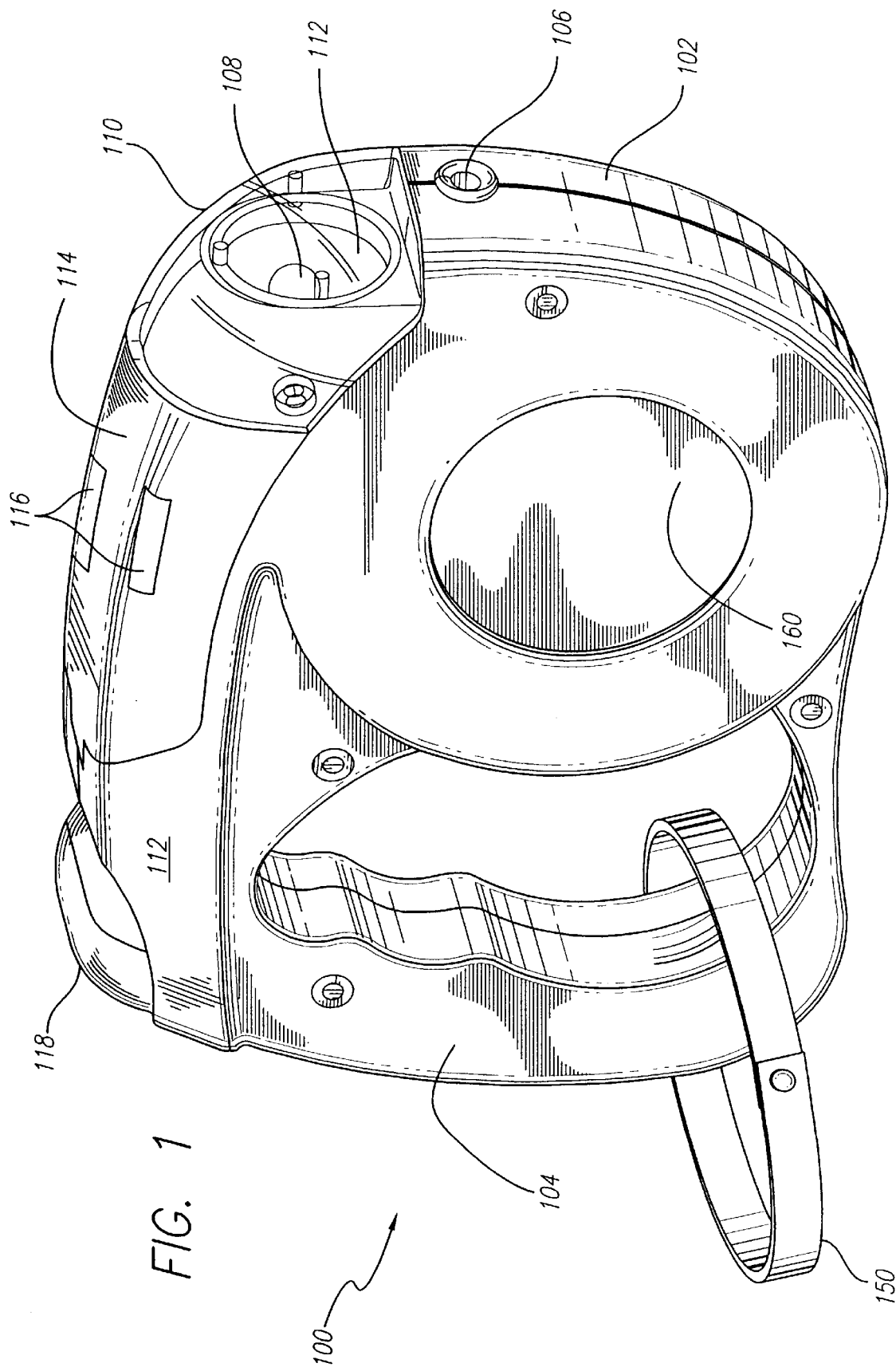
FIG. 1 is a left side perspective view of the combination pet leash and flashlight of the present invention.
Figure 2:
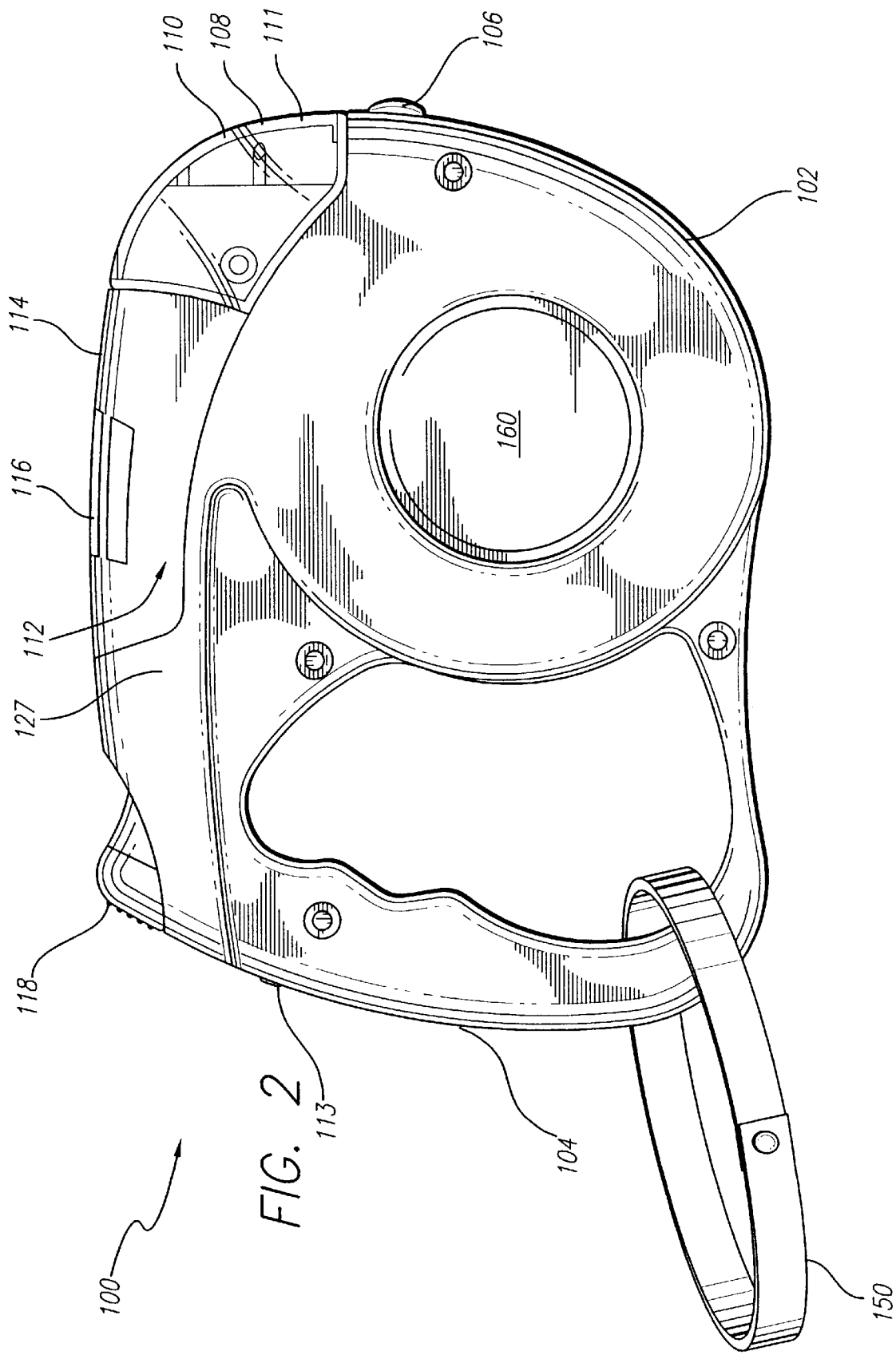
FIG. 2 is left side elevational view of FIG. 1.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to FIGS. 1–7, the first embodiment of the combined pet leash and flashlight of the present invention is shown and generally referred to by the number 100. The device 100 comprises a housing 102 having handle portion 104 and a cord exit hole 106 at the end opposite the handle portion 104 of the housing 102. Also, located above the cord exit hole 106 is a flashlight unit comprising a light bulb 108 a clear lens 110 and a reflector 111. The flashlight unit is operated by an on/off switch 113 located at the handle portion 104 of the housing 102. The power supply used to power the flashlight unit may comprise batteries contained in a battery compartment 112 having a battery door 114 for accessing the battery compartment 112. The batteries may be rechargeable and the battery door 114 may have battery contacts 116 located on the external part of the door 114 for use in recharging rechargeable batteries contained within the battery compartment 112. It is appreciated that the power supply may also include a photovoltaic cell or a regenerative electrical motor and the like.

Figure 3A:
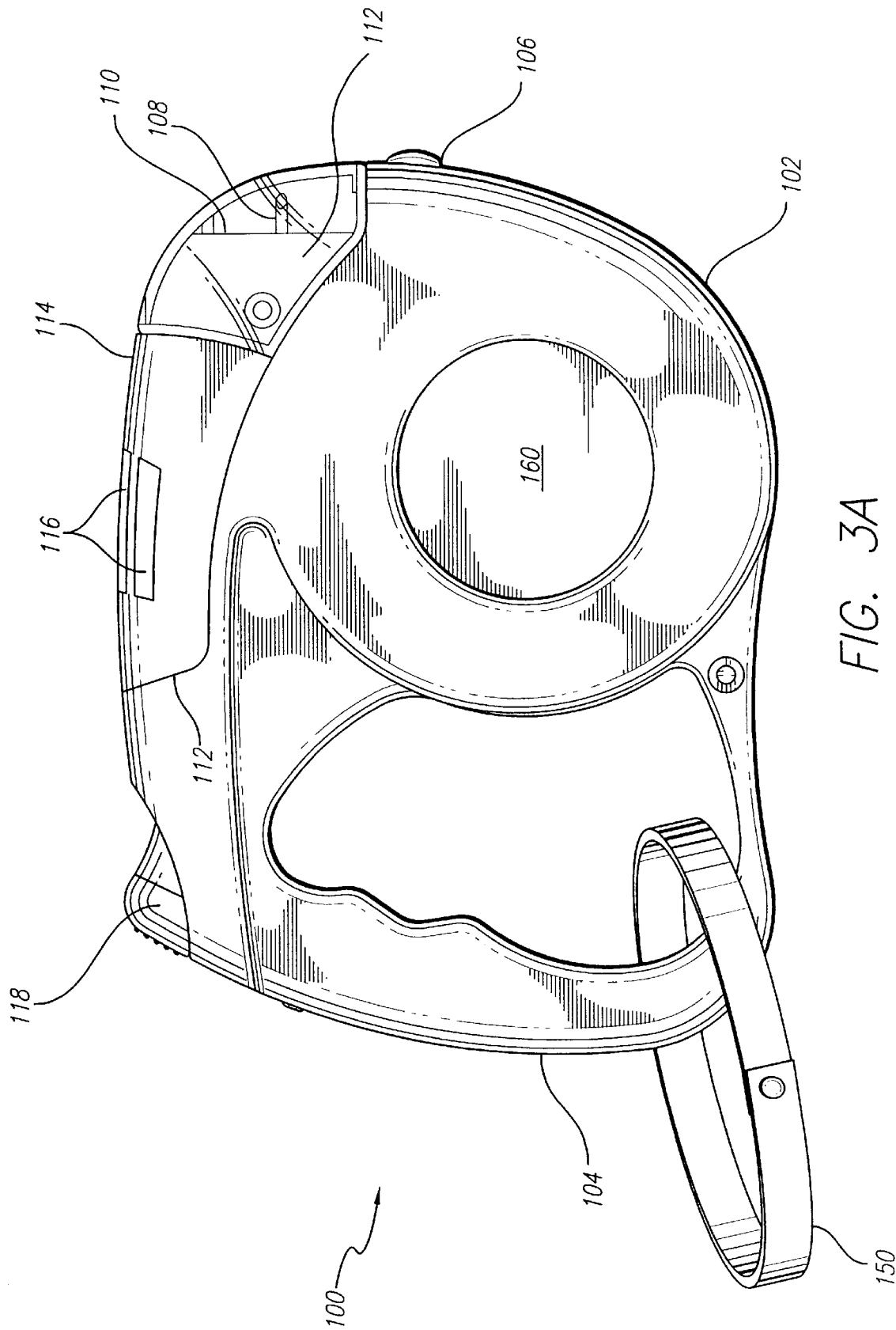
FIG. 3A is a right side elevational view of FIG. 1.
Figure 3B:
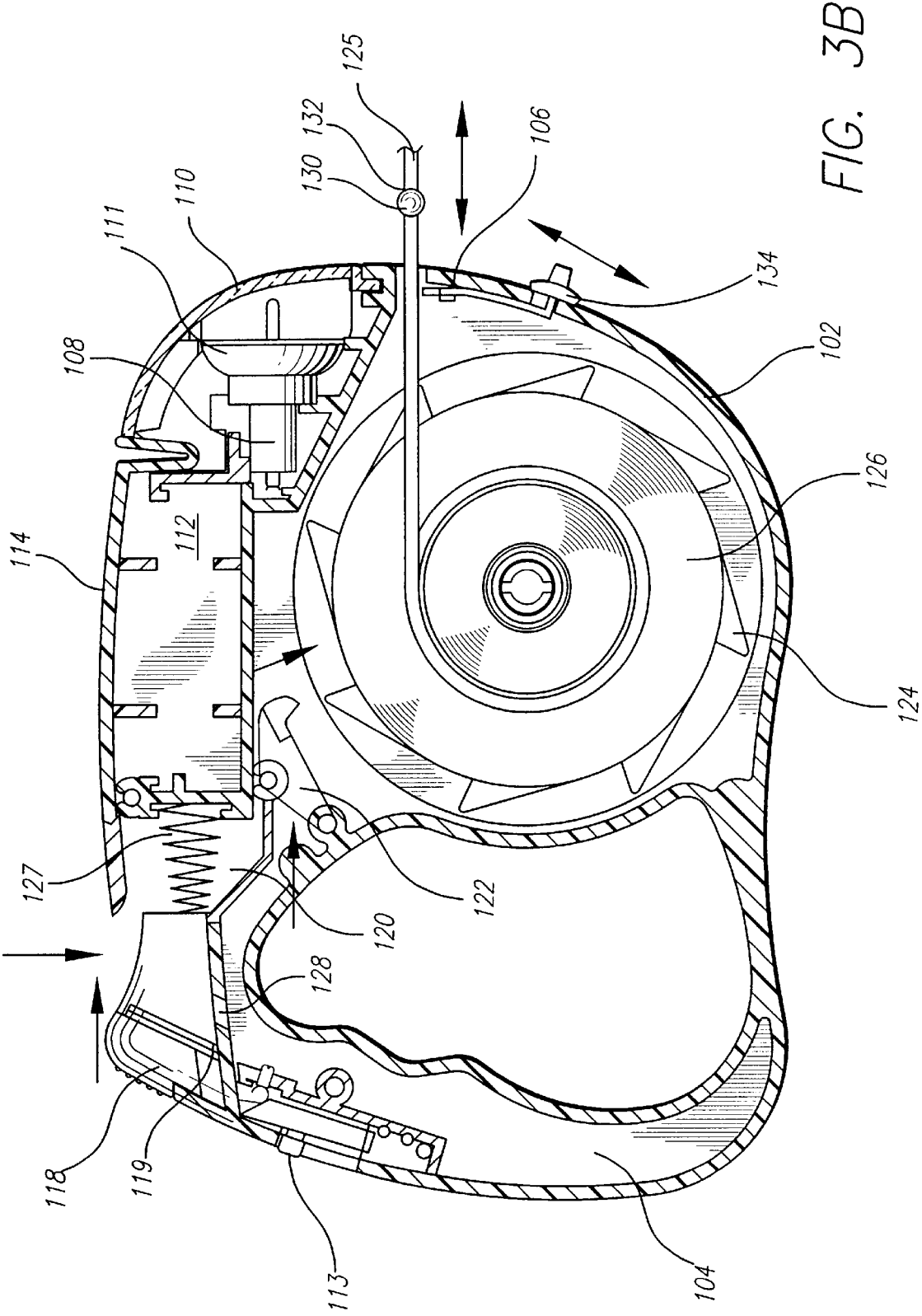
FIG. 3B is an enlarged cross sectional view of the combination pet leash and flashlight of FIG. 3A with the reel control mechanism in the unlocked position.

Referring specifically to FIGS. 3B–3C, located above the handle portion 104 is a leash stop lock button 118 for controlling the amount of leash cord that is extended or retracted within the housing 102. The leash stop lock button 118 is located proximate to the handle portion 104 such that when a user is gripping the handle portion 104, the stop lock button 118 may be activated by a finger, typically the thumb, of the same hand holding the handle portion 104. In this manner, a single hand operation of the pet leash of the present invention is made possible.

The leash stop lock button 118 is connected to a slide arm 120 which activates a pivot arm 122 for engaging the teeth 124 of the reel 126 about which the leash cord 125 is coiled. The reel 126 is spring activated and functions to retain the cord 125 in a coiled state. The leash stop/lock button 118 is spring-biased by a coiled spring 127 and is held in a locked position by a portion 119 of the leash stop button 118 engaging the slot 128 to maintain the coil spring 127 in a compressed state. In the locked position, the pivot arm 122 engages the teeth 124 of the reel 126 and prevents the movement of the reel 126 and thus limits the amount of leash cord 125 that extends from the housing 102.

Referring to FIG. 3C, the leash stop lock button 118 is shown in the locked position with the pivot arm 122 engaging one of the teeth 124. To unlock the device 100, the leash stop lock button 118 is moved upward so that it disengages from the slot 128 and is returned to its normal resting position by the coil spring 127 such that the pivot arm 122 is clear of the teeth 124 allowing the reel 126 to rotate.

The leash cord 125 includes a leash length limiter 130 which in one embodiment comprises of a bead 132 which may be permanently fixed to a portion of the leash cord 125. Alternatively, leash limiter 130 may be an adjustable stop which may be repositioned by the user in any place along the cord. An example of an adjustable stop would be a spring biased clamping means of the type used to limit the lengths of draw cords for jackets and nap sacks and the like. The bead 132 of the leash length limiter 130 has a greater diameter than the opening 106 in the housing 102 such that if the bead 132 is within the housing 102 the bead 132 is stopped by the housing 102. The leash limiter switch 134 controls the opening 106 to permit the leash length limiter 130 to pass through the housing 102. As shown in FIG. 3B, the leash length limiter switch 134 is in the opened position such that the bead 132 may pass freely through the housing 102.

Referring now to FIG. 3C, the leash length limiting switch 134 is shown in the closed position with the bead 132 within the housing 102 such that it cannot pass to the exterior of the housing 102 and the cord 125 is thereby limited to the length external to the housing 102 past the bead 132.

Referring to FIGS. 35–36, an alternative embodiment of the pet leash assembly of the present invention generally referred to by the numeral 600 is show. The pet leash assembly 600 comprises a leash length limiter 630 having a controllable mechanism allowing the user to select the amount of leash to be unreeled. Such a mechanism for example would comprise a moveable pin 640 that runs inside spiral grooves 642 molded into the outer walls of the reel 626. The number of rotations of the reel 626 would be limited via molded stops 644 in the grooves 642 which would intersect with the moveable pin 640, thus controlling the amount of leash that could unwind depending on which groove is selected for the pin run inside. The spiral grooves are divided into two or more tracks, each track having a molded stop 644 at a different point. The pin 640 and the grooves 642 are beveled such that when the pin 640 is placed in a groove it will remain fixed in place. When the pin 640 is placed into a specific groove pathway on the reel 626, the number of reel rotations possible are controlled by the fixed stop points of each groove. As only a fixed number of rotations would be possible per groove, a controllable, selectable and fixed amount of leash to be unreeled is possible.

Referring to FIGS. 37–38, another embodiment of the leash length limiter 630' is shown in which grooves 642' have been molded on the perimeter of the sides of the reel 626'. A moveable pin 640' runs inside the grooves 642' and is used to limit the number of rotations of the reel via molded stops 644' in the grooves 642'. The molded stops 644' intersect with the moveable pin 640' to stop rotation of the reel 626' and thus control the amount of leash that could unwind depending on which groove is selected for the pin run inside.

Referring to FIG. 5, the rear portion of the handle 104 in addition to the light on/off switch 113 may include a tuning button 140 for selecting the radio frequency and a volume control knob 142 to control the operation of a radio that may be part of the device 100. The handle portion 104, may also include a wrist strap 150 as a safety precaution and for holding the leash without having to grab the handle 104 of the device 100. The external portion of the housing 102 may also include a reflector 160 for increasing the visibility of the combined pet leash and flashlight at night.

Figure 8:
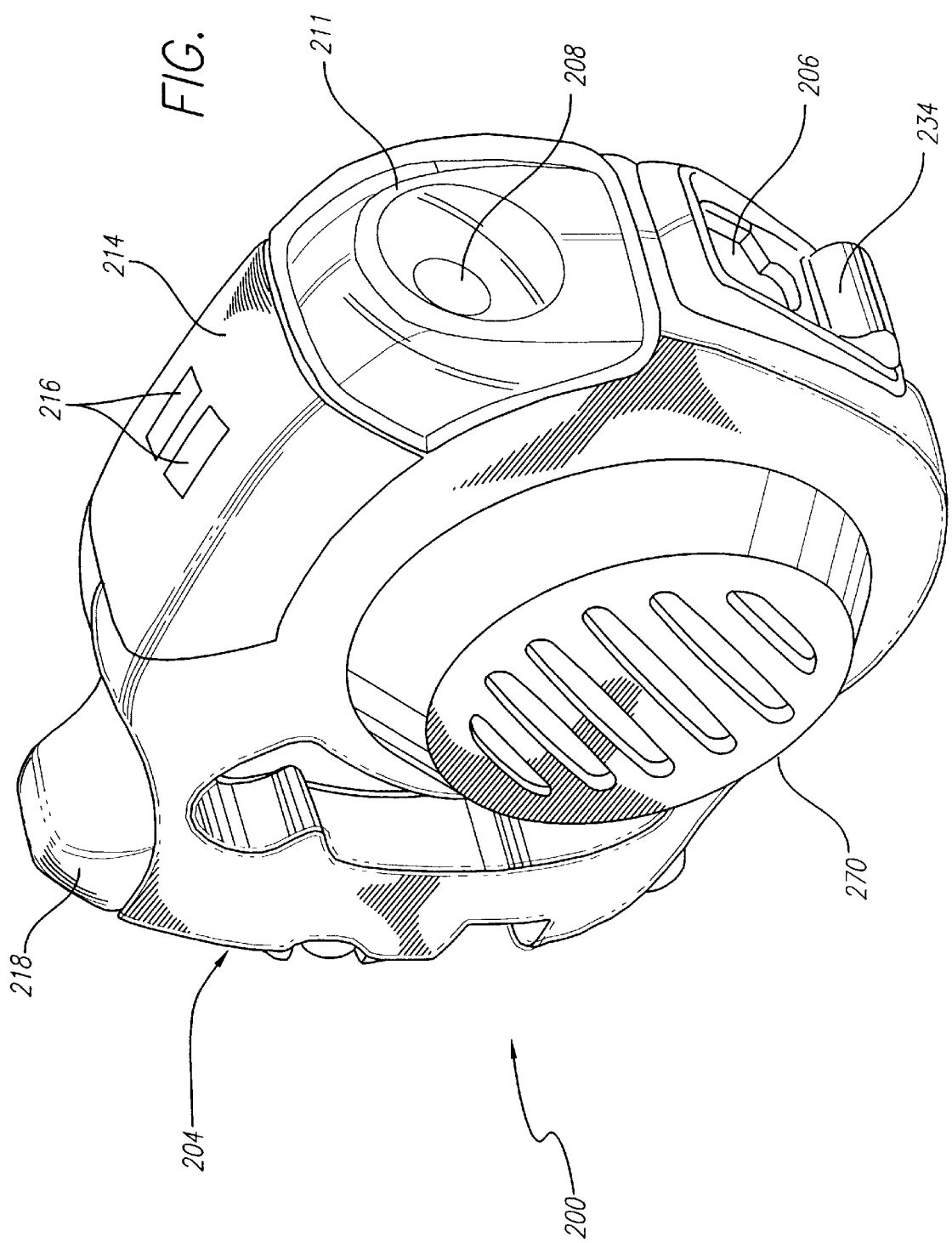
FIG. 8 is a left side perspective view of an alternative embodiment of the combination pet leash and flashlight of the present invention.
Figure 9:
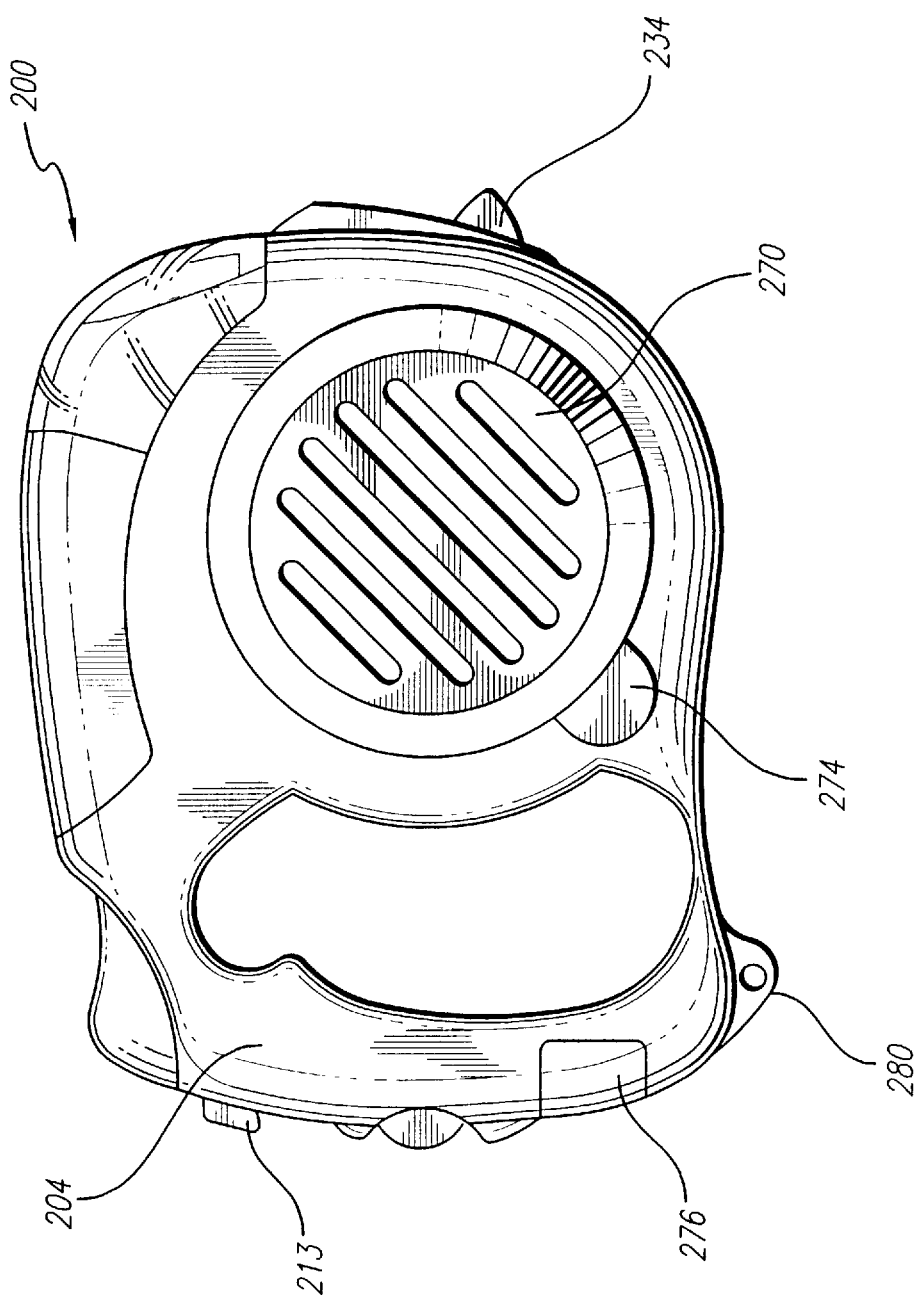
FIG. 9 is left side elevational view of FIG. 8.
Figure 10:
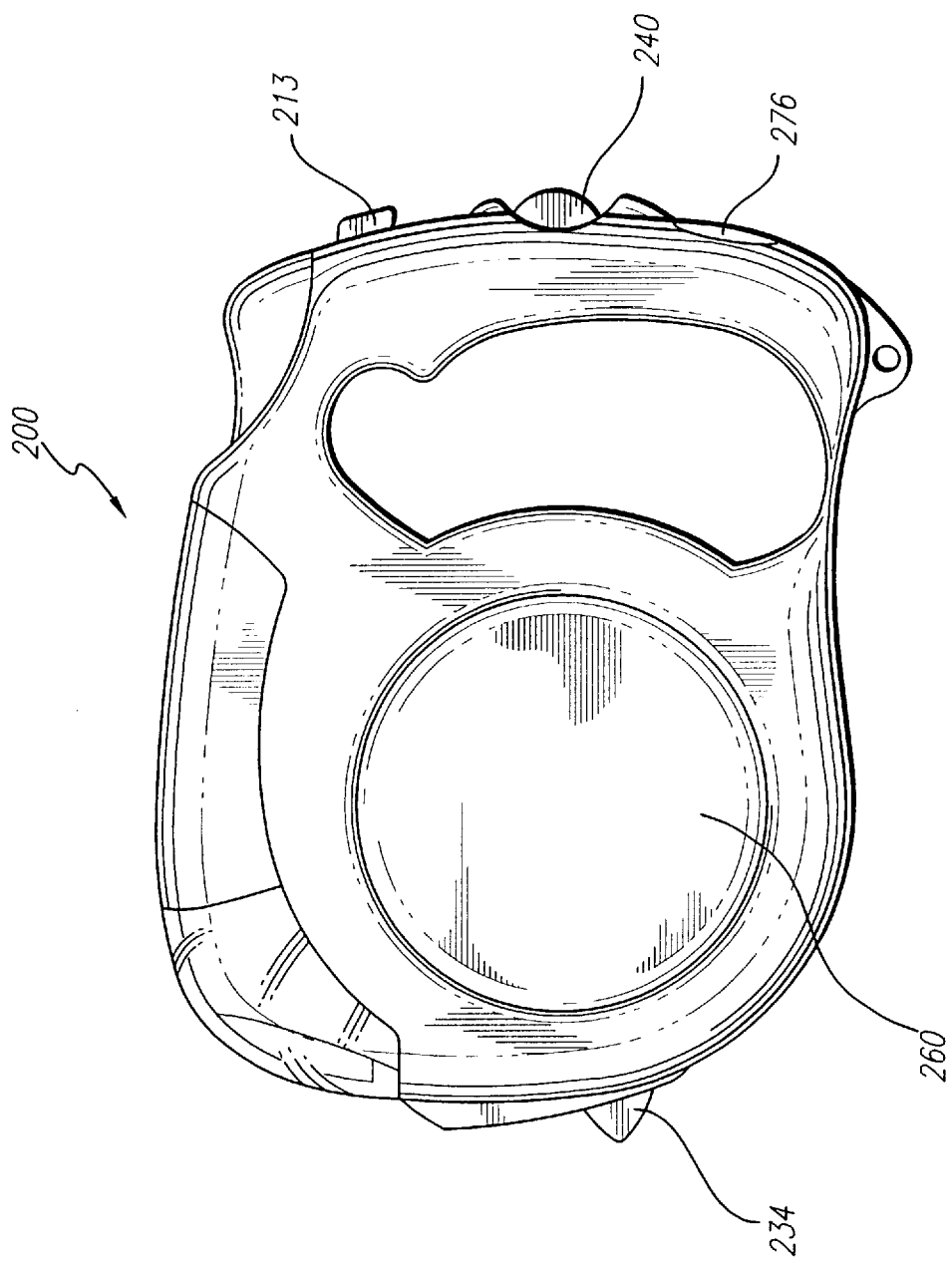
FIG. 10 is a right side elevational view of FIG. 8.
Figure 17:
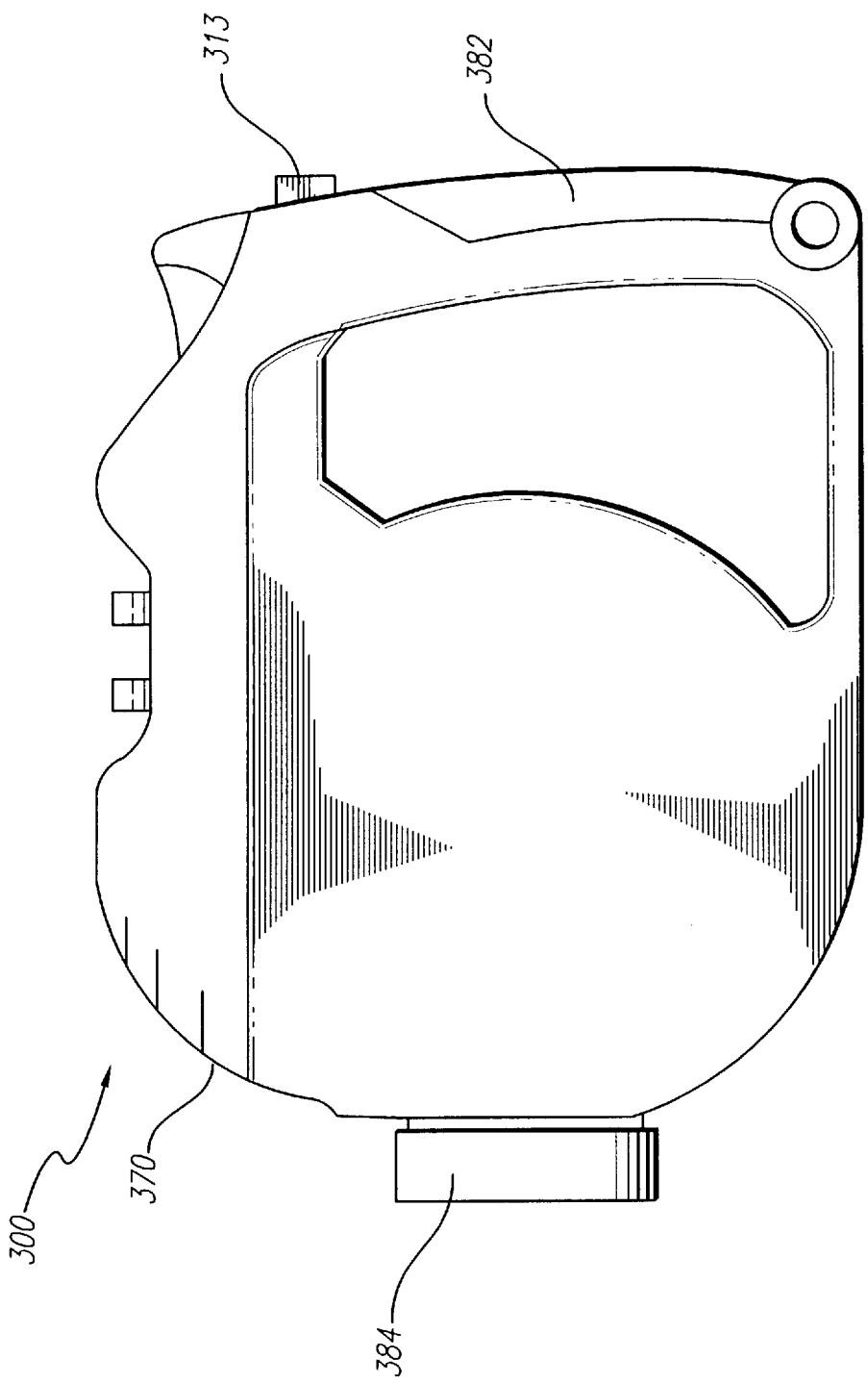
FIG. 17 is a right side elevational view of FIG. 15.
Figure 18:
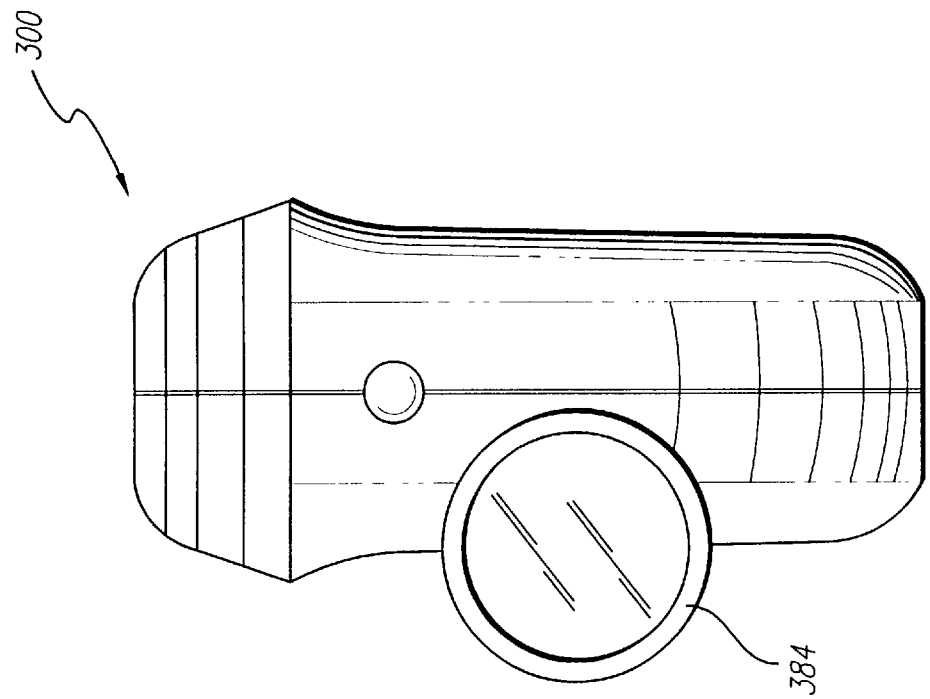
FIG. 18 is front end view of FIG. 15.
Figure 19:
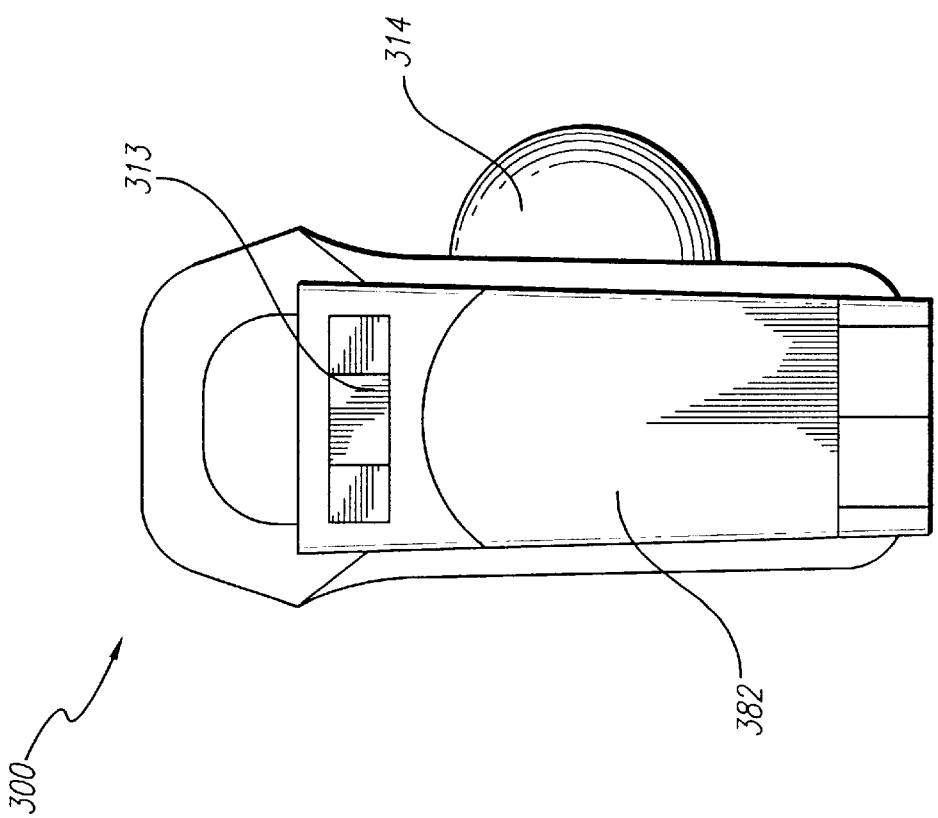
FIG. 19 is a rear end view of FIG. 15.
Figure 23:
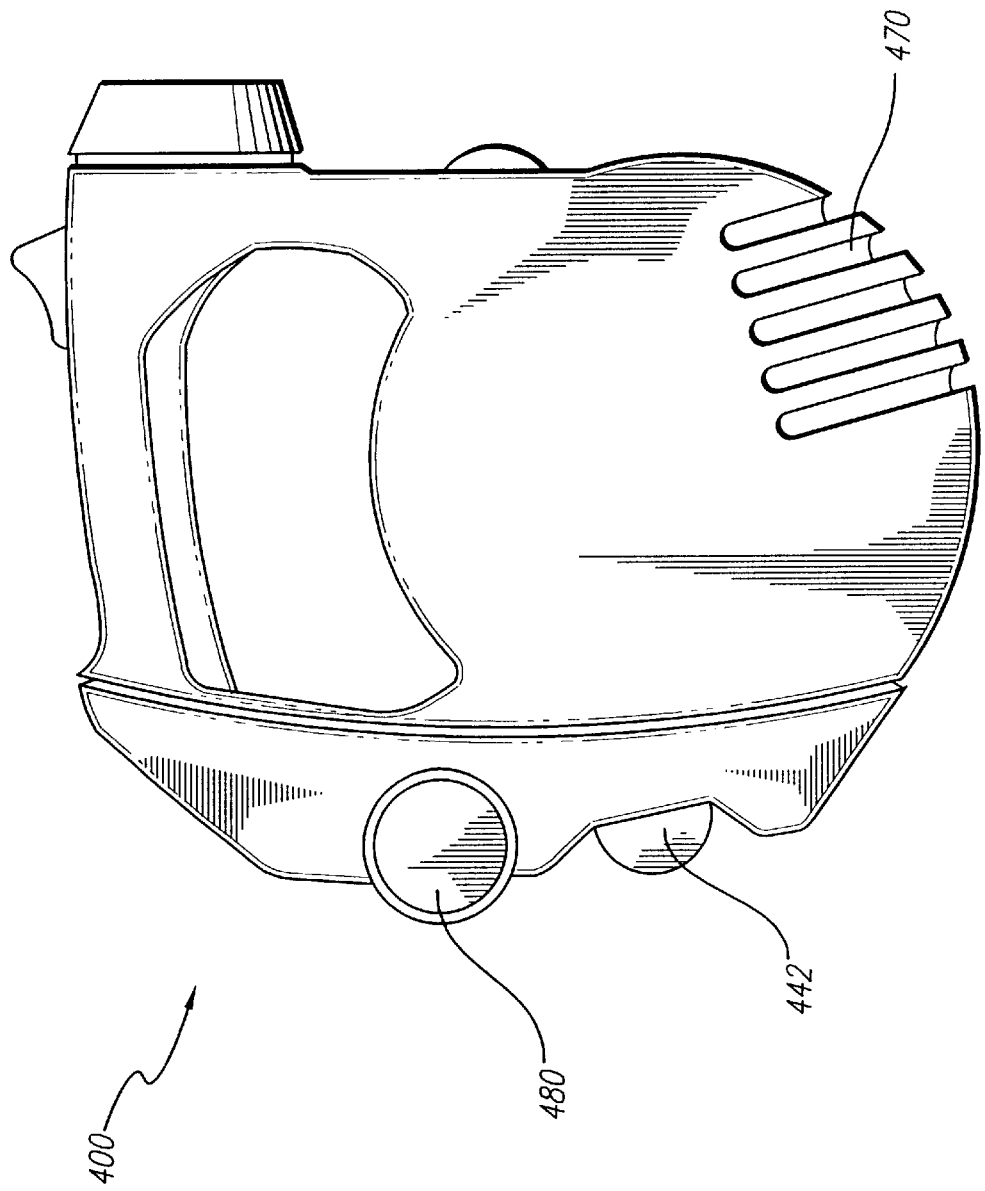
FIG. 23 is left side elevational view of FIG. 22 the right side elevational view is a mirror image thereof.
Figure 29:
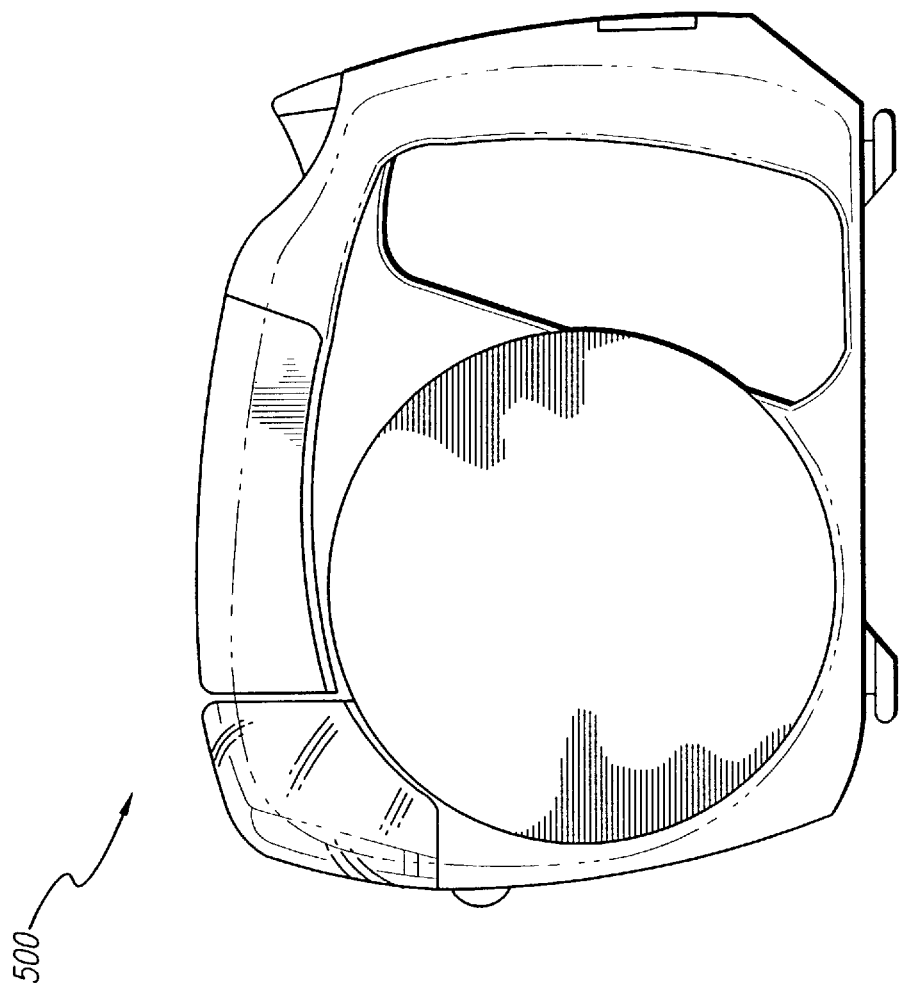
FIG. 29 is left side elevational view of FIG. 28.
Figure 30:
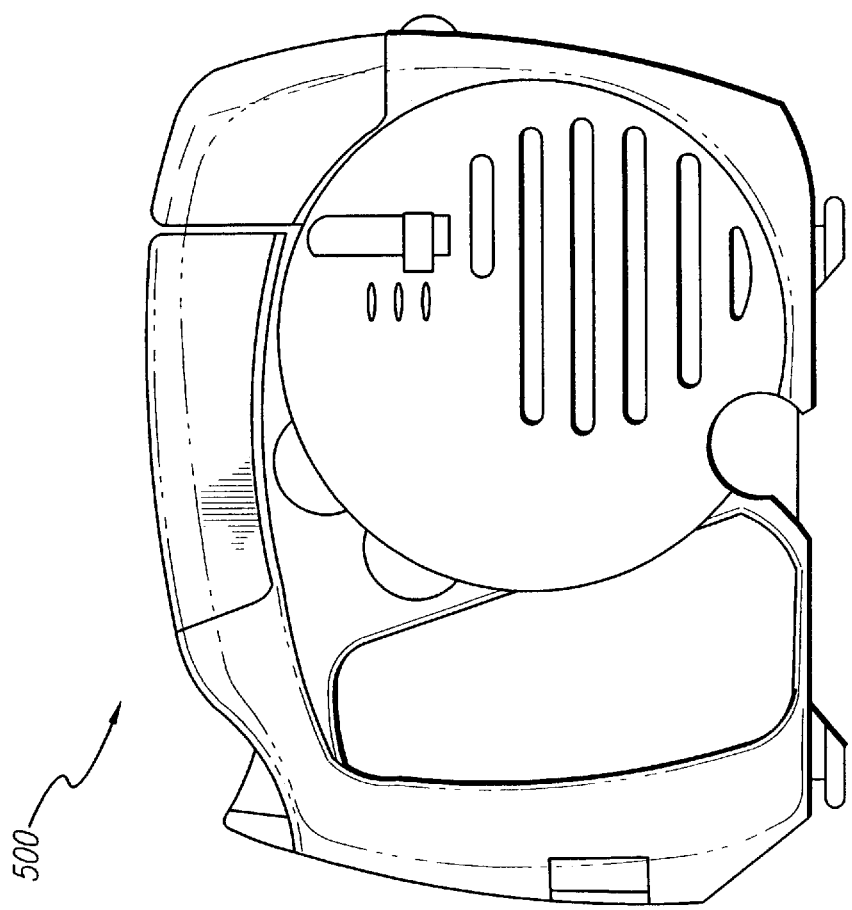
FIG. 30 is a right side elevational view of FIG. 28.

Referring to FIGS. 8–14 a second embodiment of the combination pet leash and flashlight of the present invention is shown and generally referred to by the number 200. The device 200 comprises a cord exit hole 206 that has a key hole configuration as shown in FIG. 8. The entry and exit from the housing 202 of the leash length limiter 230 is controlled by the leash length limiter switch 234 as described above. In addition to the features described above in reference to FIGS. 1–7, the device 200 includes a radio speaker grill 270 and may include flashing LED's (Light Emitting Diodes) with radio tuning and volume control knobs 240 and 242 on the handle portion as shown in FIGS. 10–12. The circumference of the grill 270 permits for the winding of a headphone cord about the speaker grill 270 and has a sunken recess 271 for storing the headphone cord. A finger slot 274 is located near the grill 270 to access the earphone cord. The handle portion 204 also contains an earphone compartment 276 for the storage of earphones in the handle. A key ring attachment point 280 is located at the base of the handle 204 for holding keys.

Referring to FIGS. 15–21 a third embodiment of the combined pet leash and flashlight of the present invention is shown and generally referred by the numeral 200. The device 300 comprises a side mounted flashlight assembly having a focusable flashlight lens 384 and comprises a radio and alarm speaker grill 370 located above the flashlight assembly of the device 300. The side mounted flashlight assembly also includes a battery door 314 for batteries. The rear handle 304 includes a storage compartment 380 for storing a number of items such as keys, headphones, coins or plastic bags for waste disposal. The storage compartment 380 is closeable by a door 382.

Referring to FIGS. 22–27 the fourth alternative embodiment of the combined pet leash and flashlight of the present invention is shown and generally referred to by the number 400. The device 400 comprises a speaker 470 for an alarm or radio. The radio would be controlled by the control knobs 440 and 442 located at the rear of the device 400. Just above the radio controls 440 and 442 is a retractable earplug compartment 480 for storing an earphone for personal listening of the radio. The device 400 includes a slide lock 490 at the top portion of the handle for easy extrusion and recoiling of the pet leash cord.

Referring to FIGS. 28–34 a fifth alternative embodiment of the combined pet leash and flashlight of the present invention is shown and generally referred to by the number 500. Device 500 includes a speaker grill 570 and an alarm grill 571 at the front end of the device 500. A volume control 545 is located on the side of the device for controlling the volume of the radio speaker and the alarm. It is possible that the alarm grill 571 may also include flashing lights in the window grill to indicate the location of the user of the device 500. The rear handle portion of the device 500 includes a storage compartment 580 into which keys, earphones, coins and the like may be stored in the like.

While the present invention has been described in detail with regards to the preferred embodiment, it is appreciated that other variations of the present invention may be devised which do not depart form the inventive concept of the present invention.

What is claimed is:

1. An illuminated pet leash assembly, comprising:
    a leash;
    a housing for containing said leash in a coiled state, said housing having a handle at one end and an opening for passage of said leash into said housing;
    a spring loaded rotating reel contained within said housing for coiling said leash;
    a stop mechanism for engaging said reel and for blocking rotation of said reel;
    a button for activating said stop mechanism, said button positioned proximate said handle;
    a light source integral to said housing; and
    a power supply electrically coupled to said light source.

2. The pet leash assembly of claim 1 in which said reel includes a plurality of teeth and said stop mechanism includes a portion for mating with said plurality of teeth.

3. The pet leash assembly of claim 1 in which said button is spring biased.

4. The pet leash assembly of claim 1 further comprising a leash length limiter.

5. The pet leash assembly of claim 4 in which said leash length limiter includes a stop member for limiting the length of leash exiting said housing, said stop member being removably engaged to said leash.

6. The pet leash assembly of claim 4 in which said leash length limiter includes means for limiting the rotation of said reel within said housing.

7. The pet leash assembly of claim 6 in which said limiting means includes at least one groove in said reel, said groove having a stop, and an engaging member fitting within said groove for engaging said stop to limit the rotation of said reel.

8. The pet leash assembly of claim 1 in which said power supply is a battery.

9. The pet leash assembly of claim 1 in which said power supply is rechargeable.

10. The pet leash assembly of claim 9 in which said rechargeable power supply is rechargeable through said housing.

11. The pet leash assembly of claims 1 further comprising a switch for activating said light source.

12. The pet leash assembly of claim 11 in which said switch is positioned on said handle and can be activated by a user's thumb.

13. The pet leash assembly of claim 12 in which said button is oriented proximate said switch such that said switch and said button can be activated with a user's thumb.

14. The pet leash assembly of claim 1 further comprising a light reflector on said housing for reflecting light at night.

15. The pet leash assembly of claim 1 further comprising a radio receiver.

16. The pet leash assembly of claim 15 further comprising a loud speaker.

17. The pet leash assembly of claim 15 further comprising an earphone.

18. The pet leash assembly of claim 15 further comprising a volume control for controlling the volume of said radio receiver.

19. The pet leash assembly of claim 15 further comprising a frequency selector for selecting the frequency of said radio receiver.

20. The pet leash assembly of claim 1 further comprising a storage compartment.

21. The pet leash assembly of claim 20 in which said storage compartment has a closeable access opening.

22. The pet leash assembly of claim 1 further comprising a wrist strap connected to said handle for engaging the wrist of the user.

23. An pet leash assembly, comprising:
    a leash;
    a housing for containing said leash in a coiled state, said housing having a handle at one end and an opening for passage of said leash into said housing;
    a spring loaded rotating reel for coiling said leash contained within said housing;
    a stop mechanism for engaging said reel and for blocking rotation of said reel;
    a button for activating said stop mechanism, said button positioned proximate said handle;
    a radio receiver integral to said housing; and
    a power supply electrically coupled to said radio receiver.

24. The pet leash assembly of claim 23 further comprising a loud speaker.

25. The pet leash assembly of claim 23 further comprising an earphone.

26. The pet leash assembly of claim 23 further comprising a volume control for controlling the volume of said radio receiver.

27. The pet leash assembly of claim 23 in which said power supply is a battery.

28. The pet leash assembly of claim 27 in which said power supply is rechargeable.

29. The pet leash assembly of claim 28 in which said rechargeable power supply is rechargeable through said housing.

30. The pet leash assembly of claim 23 further comprising a frequency selector for selecting the frequency of said radio receiver.

31. The pet leash assembly of claim 23 further comprising a wrist strap connected to said handle for engaging the wrist of the user.

32. A combined radio and pet leash assembly, comprising:
    a leash;
    a housing coupled to said leash and having a handle;
    a radio receiver; and
    a power supply electrically coupled to said radio receiver.

33. The pet leash assembly of claim 32 further comprising a loud speaker.

34. The pet leash assembly of claim 32 further comprising an earphone.

35. The pet leash assembly of claim 32 further comprising a volume control for controlling the volume of said radio receiver.

36. The pet leash assembly of claim 32 further comprising a frequency selector for selecting the frequency of said radio receiver.

37. The pet leash assembly of claim 32 further comprising a wrist strap connected to said handle for engaging the wrist of the user.

38. A pet leash assembly, comprising:
    a leash;
    a housing for containing said leash in a coiled state, said housing having a handle at one end and an opening for passage of said leash into said housing;

a spring loaded rotating reel contained within said housing for coiling said leash, said reel having a central axis and a plurality of teeth radially disposed about said central axis of said reel;

a stop/lock mechanism for engaging said reel and for blocking rotation of said reel, said stop/lock mechanism having a teeth engaging member for complementary engagement of one of said plurality of teeth to stop rotation of said reel; and a two position button for activating said stop/lock mechanism positioned proximate said handle, said button having a first position for advancing said teeth engaging member to engage one of said plurality of teeth and temporarily pause rotation of said reel as long as pressure is applied to said button by the user, and a second position for locking said teeth engaging member to engage one of said plurality of said teeth and stop rotation of said reel without application of pressure to said button by the user.

39. The pet leash assembly of claim 38 in which said button is spring biased.

40. The pet leash assembly of claim 38 in which said button is adapted to be operated by a user's thumb of the same hand that is used to hold said handle.

41. The pet leash assembly of claim 38 in which said housing includes a slot for holding said button is said second position.

42. The pet leash assembly of claim 38 further comprising a leash length limiter.

43. The pet leash assembly of claim 42 in which said leash length limiter includes a stop member for limiting the length of leash exiting said housing, said stop member being removably engaged to said leash.

44. The pet leash assembly of claim 42 in which said leash length limiter includes means for limiting the rotation of said reel within said housing.

45. The pet leash assembly of claim 44 in which said limiting means includes at least one groove in said reel, said groove having a stop, and an engaging member fitting within said groove for engaging said stop to limit the rotation of said reel.

46. The pet leash assembly of claim 38 further comprising a wrist strap connected to said handle for engaging the wrist of the user.

* * * * *